(12) United States Patent
Chen et al.

(10) Patent No.: US 11,421,146 B2
(45) Date of Patent: Aug. 23, 2022

(54) VISCOELASTIC FLUIDS AND METHODS OF USE

(71) Applicant: The Board of Regents of the University of Oklahoma, Norman, OK (US)

(72) Inventors: Changlong Chen, New Brunswick, NJ (US); Jeffrey H. Harwell, Norman, OK (US); Bor Jier Shiau, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 16/620,445

(22) PCT Filed: Jun. 6, 2019

(86) PCT No.: PCT/US2019/035791
§ 371 (c)(1),
(2) Date: Dec. 6, 2019

(87) PCT Pub. No.: WO2019/236846
PCT Pub. Date: Dec. 12, 2019

(65) Prior Publication Data
US 2020/0392395 A1    Dec. 17, 2020

Related U.S. Application Data

(60) Provisional application No. 62/681,334, filed on Jun. 6, 2018.

(51) Int. Cl.
*C09K 8/584* (2006.01)
*C09K 8/60* (2006.01)
(Continued)

(52) U.S. Cl.
CPC .............. *C09K 8/584* (2013.01); *C09K 8/602* (2013.01); *C09K 8/68* (2013.01); *C09K 8/80* (2013.01);
(Continued)

(58) Field of Classification Search
CPC .......... C09K 8/584; C09K 8/602; C09K 8/68; C09K 8/80; C09K 2208/30; E21B 43/16;
(Continued)

(56) References Cited

U.S. PATENT DOCUMENTS 4,293,428 A    10/1981 Gale et al.
4,452,708 A    6/1984 Aldrich et al.
(Continued)

OTHER PUBLICATIONS

Tanford, C.; "Micelle Shape and Size"; The Journal of Physical Chemistry 76:21 (1972) 3020-3024.
(Continued)

*Primary Examiner* — Aiqun Li
(74) *Attorney, Agent, or Firm* — Hall Estill Law Firm

(57) ABSTRACT

A viscoelastic emulsion formed by combining at least one extended surfactant, a salt (e.g., brine), an oil, such as crude oil, diesel, kerosene, or a vegetable oil, and water, into a mixture comprising an oil-starved Winsor III microemulsion into which excess oil is dispersed. The viscoelastic emulsion may be combined with a proppant to form a fracking fluid. The viscoelastic emulsion may be used in various reservoir applications, such as hydraulic fracturing, or flooding for enhanced tertiary oil recovery, and in other applications such as, but not limited to, environmental remediation, or formation of consumer products.

27 Claims, 12 Drawing Sheets

(51) Int. Cl.
  *C09K 8/68*  (2006.01)
  *C09K 8/80*  (2006.01)
  *E21B 43/16*  (2006.01)
  *E21B 43/26*  (2006.01)
  *E21B 43/267*  (2006.01)

(52) U.S. Cl.
  CPC .............. *E21B 43/16* (2013.01); *E21B 43/26* (2013.01); *C09K 2208/30* (2013.01); *E21B 43/267* (2013.01)

(58) Field of Classification Search
  CPC .... E21B 43/26; E21B 43/267; Y10S 507/937; Y10S 507/938
  See application file for complete search history.

(56) References Cited

U.S. PATENT DOCUMENTS

| | | | |
|---|---|---|---|
| 5,135,052 | A | 8/1992 | Puerto |
| 8,091,646 | B2 | 1/2012 | Quintero et al. |
| 8,235,120 | B2 | 8/2012 | Quintero et al. |
| 2008/0200565 | A1 | 8/2008 | Harwell et al. |
| 2014/0073541 | A1 | 3/2014 | Ravikiran et al. |
| 2014/0096967 | A1 | 4/2014 | Sharma et al. |
| 2014/0096969 | A1 | 4/2014 | Ali et al. |
| 2016/0017204 | A1* | 1/2016 | Hill .......................... C09K 8/62 166/305.1 |

OTHER PUBLICATIONS

Faetibold, E., et al.; "Dynamical Properties of Wormlike Micelles in the Vicinity of the Crossover between Dilute and Semidilute Regimes"; Langmuir 11 (1995) 1972-1979.
Alexandridis, P.; "Poly(ethylene oxide)/poly(propylene oxide) block copolymer surfactants"; Current Opinion in Colloid & Interface Science 2 (1997) 478-489.
Kumar, S., et al.; "Micellar Growth in the Presence of Salts and Aromatic Hydrocarbons: Influence of the Nature of the Salt"; Langmuir 15 (1999) 4960-4965.
Van Vlimmeren, B.A.C., et al.; "Simulation of 3D Mesoscale Structure Formation in Concentrated Aqueous Solution of the Triblock Polymer Surfactants (Ethylene Oxide)13(Propylene Oxide)30(Ethylene Oxide)13 and (Propylene Oxide)19(Ethylene Oxide)33(Propylene Oxide)19 Application of Dynamic Mean-Field Density Functional Theory"; Macromolecules 32 (1999) 646-656.
Ivanova, R., et al.; "Evolution in Structural Polymorphism of Pluronic F127 Poly(ethylene oxide)-Poly(propylene oxide) Block Copolymer in Ternary Systems with Water and Pharmaceutically Acceptable Organic Solvents: From 'Glycols' to 'Oils'"; Languier 16 (2000) 9058-9069.
Raghavan, S.R., et al.; "Highly Viscoelastic Wormlike Micellar Solutions Formed by Cationic Surfactants with Long Unsaturated Tails"; Langmuir 17 (2001) 300-306.
Mu, JH, et al.; "Rheological Properties and Microstructures of Anionic Micellar Solutions in the Presence of Different Inorganic Salts"; J. Phys. Chem. B 106 (2002) 11685-11693.
Croce, V., et al.; "Rheology, Cryogenic Transmission Electron Spectroscopy, and Small-Angle Neutron Scattering of Highly Viscoelastic Wormlike Micellar Solutions"; Langmuir 19 (2003) 8536-8541.
Oelschlaeger, C., et al.; "Rheological Behavior of Locally Cylindrical Micelles in Relation to Their Overall Morphology"; Langmuir 19 (2003) 10495-10500.
Siriwatwechakul, W., et al.; "Effects of Organic Solvents on the Scission Energy of Rodlike Micelles"; Langmuir 20 (2004) 8970-8974.
Croce, V., et al.; "Giant Micellar Worms under Shear: A Rheological Study Using SANS"; Langmuir 21 (2005) 6762-6768.

Salager, JL, et al.; "Enhancing Solubilization in Microemulsions—State of the Art and Current Trends"; Journal of Surfactants and Detergents 8:1 (2005) 3-21.
Berret, JF; "Rheology of Wormlike Micelles; Equilibrium Properties and Shear Banding Transitions"; Molecular Gels. Materials with Self-Assembled Fibrillar Networks (2006) 667-720.
Dreiss, C.A.; "Wormlike micelles: where do we stand? Recent developments, linear rheology and scattering techniques"; Soft Matter 3 (2007) 956-970.
Kumar, R., et al.; "Wormlike Micelles of a C22-Tailed Zwitterionic Betaine Surfactant: From Viscoelastic Solutions to Elastic Gels"; Langmuir 23 (2007) 12849-12856.
Sato, T., et al.; "Oil-Induced Structural Change of Wormlike Micelles in Sugar Suractant Systems"; Journal of Dispersion Science and Technology 27 (2006) 611-616.
Zana, R. (editor), et al.; "Giant Micelles: Properties and Applications"; CRC Press Taylor & Francis Group; Surfactant Science Series 140 (2007) 578 pages.
Trickett, K., et al.; "Surfactant-based gels"; Advances in Colloid and Interface Science 144 (2008) 66-24.
Withayapanyanon, A., et al.; "Hydrophilic-lipophilic deviation (HLD) method for characterizing conventional and extended surfactants"; Journal of Colloid and Interface Science 325 (2008) 259-266.
Acosta, E.J., et al.; "The HLD-NAC Model for Mixtures of Ionic and Nonionic Surfactants"; J Surface Deterg 12 (2009) 7-19.
Sharma, S.C., et al.; "Viscoelastic Wormlike Micelles in Mixed Nonionic Fluorcarbon Suractants and Structural Transition Induced by Oils"; J. Phys. Chem. B 113 (2009) 1615-1622.
Cates, M.E., et al.; "Rheology of giant micelles"; Advances in Physics 55:7-8 (2006) 799-879.
Chu, Z., et al.; "Wormlike Micelles and Solution Properties of a C22-Tailed Amidosulfobetaine Surfactant"; Langmuir 26:11 (2010) 7783-7791.
Kiran, S.K., et al.; "Predicting the Morphology and Viscosity of Microemulsions Using the HLD-NAC Model"; Ind. Eng. Chem. Res. 49 (2010) 3424-3432.
Oelschlaeger, C., et al.; "Effect of Counterion Binding Efficiency on Structure and Dynamics of Wormlike Micelles"; Langmuir 26:10 (2010) 7045-7053.
Witthayapanyanon, A., et al.; "Interfacial Properties of Extended-Surfactant-Based Microemulsions and Related Macroemulsions"; J. Surfact. Deterg. 13 (2010) 127-134.
"Soft and Biological Structures—Introduction: Equilibrium Considerations of Fluid Amphiphilic Structures"; Intermolecular and Surface Forces 3 (2011) 535-576.
Afifi, H., et al.; "Structural transitions in cholesterol-based wormlike micelles induced by encapsulating alyl ester oils with varying architecture"; Journal of Colloid and Interface Science 378 (2012) 125-134.
Parker, A., et al.; "Viscoelasticity of anionic wormlike micelles: Effects of ionic strength and small hydrophobic molecules"; Soft Matter 9 (2013) 1203-1213.
Rosen, M.J., et al.; "Surfactants and Interfacial Phenomena"; John Wiley & Sons, Inc. Publication (2012) 615 pages.
Chu, Z., et al.; "Smart wormlike micelles"; Chem. Soc. Rev. 42 (2013) 7174-7203.
Rogers, S.A., et al.; "Rheology of branched wormlike micelles"; Current Opinion in Colloid & Interface Science 19 (2014) 530-535.
Shibaev, A.V., et al.; "How a Viscelastic Solution of Wormlike Micelles Transforms into Microemulsion upon Absorption of Hydrocarbon: New Insight"; Langmuir 30 (2014) 3705-3714.
Aho, J., et al.; "Rheology as a tool for evaluation of melt processability of innovative dosage forms"; International Journal of Pharmaceutics 494 (2015) 623-642.
Shibaev, A.V., et al.; "Rheology Behavior of Oil-Swollen Wormlike Surfactant Micelles"; J. Phys. Chem. B 119 (2015) 15938-15946.
Budhathoki, M., et al.; "Design of an optimal middle phase microemulsion for ultra high saline brine using hydrophilic lipophilic deviation (HLD) method"; Colloids and Surfaces A: Physicochem. Eng. Aspects 488 (2016) 36-45.
McCoy, T.M., et al.; "Structural Evolution of Wormlike Micellar Fluids Formed by Erucyl Amidopropyl Betaine with Oil, Salts, and Surfactants"; Langmuir 32 (2016) 12423-12433.

(56) References Cited

OTHER PUBLICATIONS

Fu, Y., et al.; "Viscoelasticity enhancement induced by salts for highly concentrated oil-in-water (O/W) emulsions"; Colloids and Surfaces A: Physicochem. Eng. Aspects 513 (2017) 280-286.
Raghavan, S.R., et al.; "Wormlike Micelles: Solutions, Gels, or Both?"; The Royal Society of Chemstry (2017) 9-30.
Chen, C.; "Carbonaceous Nanosized Surfactant Carriers and Oil-Induced Viscelastic Fluid for Potential EOR Applications"; Dissertation submitted to the Graduate Faculty of University of Oklahoma (2018) 184 pages.
Choi, F., et al.; "Oil-induced formation of branched wormlike micelles in an alcohol propoxysulfate extended surfactant system" Soft Matter 14 (2018) 8378-8389.
PCT/US2019/035791; "International Search Report and Written Opinion"; International Searching Authority; dated Aug. 30, 2019; 16 pages.

* cited by examiner

VISCOELASTIC FLUIDS AND METHODS OF USE

CROSS-REFERENCE TO RELATED APPLICATIONS

The present application is a national stage application of a PCT application having International Application No. PCT/US2019/035791, filed Jun. 6, 2019, which claims priority to U.S. Provisional Application having U.S. Ser. No. 62/681,334, filed Jun. 6, 2018, which claims the benefit under 35 U.S.C. 119(e), the disclosure of which is hereby expressly incorporated herein by reference.

BACKGROUND

The stages of production (oil recovery) of a hydrocarbon reservoir can be categorized as primary recovery, secondary recovery, and tertiary recovery. The first two stages, also known as conventional recovery, basically rely on the natural drive mechanism and artificial reservoir pressure maintenance, respectively. Conventional oil recovery is about 35%. Any techniques applied after the secondary stage to produce oil unrecoverable by conventional means are classified tertiary recovery, also known as enhanced oil recovery (EOR). EOR processes used include (1) thermal recovery, including steam flood, in-situ combustion, and steam assisted gravity drainage, (2) solvent method including injection of miscible $CO_2$, hydrocarbon, nitrogen, and immiscible gases, and (3) chemical flood, such as surfactant, polymer, and alkaline flood. EOR can achieve another 5% to 15% recovery of original oil in place (OOIP) in a reservoir depending on the methods used. In conventional surfactant flooding (a form of chemical flooding for EOR), a finite slug of surfactant-only or mixture of surfactant/polymer solution is injected into a reservoir. Surfactants dramatically reduce the residual oil/water interfacial tension (IFT) thus causing mobilization of the trapped oil which can not be removed by primary and secondary methods. Despite the technical viability of surfactant flooding, this approach has some difficulties in being efficiently utilized at a large field scale, for example due to substantial adsorption loss, unfavorable sweep efficiency of surfactant-only slug, and polymer contamination.

Oil Recovery Efficiency

Total oil recovery efficiency $E_R$, is the amount of the oil displaced divided by the initial oil in place in the swept portion of the reservoir. It is expressed as:

$$E_R = E_D \times E_V \quad (1)$$

where $E_V$ is macroscopic displacement efficiency, and $E_D$ is microscopic displacement efficiency. The former one is defined as the fraction of the reservoir volume swept by the displacing fluid. $E_V$ is expressed as the product of areal sweep efficiency $E_A$, and vertical sweep efficiency $E_z$, $$E_V = E_A \times E_Z \quad (2)$$

$E_D$ is defined as the volume of oil displaced from the invaded region divided by the volume of the oil initially in place in the invaded region as, $$E_D = 1 - \frac{S_{or}}{S_{oi}} \quad (3)$$

where $S_{or}$ is the residual oil saturation in the swept region, and $S_{oi}$ is the initial oil saturation in the swept region.

Clearly, increasing either $E_V$ or $E_D$ is beneficial to give rise to a higher ultimate oil recovery, and these are two principal mechanisms behind chemical flood. Higher $E_V$ is achievable via polymer flooding to provide favorable mobility control, while higher $E_D$ can be attained by injecting surfactants or alkali to reduce oil water interfacial tension (IFT).

Mobility and Mobility Ratio

The mobility of a fluid, $\lambda$, is defined as the ratio of its effective permeability to its viscosity, expressed as:

$$\lambda_i = \frac{k_i}{\mu_i} \quad (4)$$

where $k_i$ is the effective permeability of the fluid, and $\mu_i$ is viscosity. Mobility ratio, M, is simply the ratio of the mobility of the displacing phase to the mobility of the displaced phase. For water displacing oil in water flooding, it is given by:

$$M = \frac{\lambda_w}{\lambda_o} = \frac{k_w}{k_o} * \frac{\mu_o}{\mu_w} \quad (5)$$

where the notation w, and o indicates water and oil phase respectively. From the definition, the displacement process is favorable if $M \leq 1$, i.e., the displaced fluid is more mobile than the displacing fluid. And the process is considered unfavorable if M>1, i.e., the displaced fluid is less mobile than the displacing fluid. High mobility ratio could lead to viscous fingering, which can bypass a significant amount of oil.

Capillary Pressure and Capillary Number

Capillary pressure, $p_c$, is the difference in pressure of the non-wetting phase and the pressure of the wetting phase. This is represented as:

$$p_c = p_{nw} - p_w = \frac{2\sigma * \cos \theta}{r} \quad (6)$$

where $p_{nw}$, and $p_w$ are the pressure of non-wetting and wetting phase, respectively. $\sigma$ is the water and oil interfacial tension, $\theta$ is the contact angle, and r is the effective radius of the interface. Consider a water wetting reservoir; capillary pressure could increase significantly at the pore neck, where the effective radius is extremely small, therefore, stopping the oil drop from passing through the pore neck. When ultralow IFT (<0.001 mN/m) is achieved, e.g., via using surfactant, the capillary pressure can reduce to a sufficiently low level (four to five orders of magnitudes lower) to allow the oil drop to deform and pass through the pore neck.

Capillary number is defined as the ratio of viscous force (mobilizes oil) to capillary force (traps oil) by, $$N_c = \frac{v * \mu}{\sigma} \quad (7)$$

where v is interstitial velocity, p is viscosity of displacing fluid, and a is the IFT between water and oil. Capillary number can be increased by either increasing the viscous forces or decreasing the IFT using surfactants, the latter one being a more effective and practical way to increase the capillary number by several orders of magnitude.

Surfactants, Micelles, and Microemulsions

Surfactants are substances comprising a hydrophobic hydrocarbon tail and a hydrophilic head, thus they are soluble in both oil and water phase. Surfactants have the propensity to adsorb onto the surfaces or interfaces of the system and reduce the surface or interfacial free energies of those surfaces or interfaces. Depending on the charge of the head groups, surfactants are classified as anionic, cationic, nonionic, and zwitterionic. In chemical EOR, anionic surfactants are most widely used because they exhibit relatively low adsorption at neutral to high pH on both sandstones and carbonates, can be tailored to a wide range of conditions, and are widely available at relative low cost. Nonionic surfactants are used as co-surfactants to improve the behavior of the surfactant system due to their excellent tolerance to salinity and hardness brine.

Micelles and Packing Parameter

In the surfactant solution, once the concentration is sufficiently high, surfactant molecules will form aggregates called micelles. The concentration of surfactants above which micelles form is called the critical micelle concentration (CMC); above CMC all additional surfactants added to the system go to micelles. A normal micelle forms in a water solution, with hydrophobic hydrocarbon groups in the interior and hydrophilic head groups exposed to the external aqueous solution. Reverse micelles form in nonpolar solvents, with hydrophilic head groups oriented in the interior, and hydrophobic hydrocarbon groups exposed to the similar groups of the surrounding solvent.

Based upon the geometry of various micellar shapes and the space occupied by the hydrophilic and hydrophobic groups of the surfactant molecules, the micelle shape can be estimated by critical packing parameter (CP), $$CP = \frac{V}{a_0 * l_c} \quad (8)$$

where V is the volume occupied by the hydrophobic groups in the micellar core, $l_c$ is the length of the hydrophobic group in the core, and $a_o$ is the cross-sectional area occupied by the hydrophilic group at the micelle-solution interface. The major types of micelles appear to be (1) relatively small spherical structures ($0<CP<\frac{1}{3}$), (2) elongated cylindrical, rodlike micelles ($\frac{1}{3}<CP<\frac{1}{2}$), (3) large, flat lamellar micelles ($\frac{1}{2}<CP<1$), and (4) reverse micelles in nonpolar phase ($CP>1$).

Micelle structure can be tuned via altering the electrolyte content, temperature, pH, and the presence of additives in the solution. For instance, increasing electrolyte content of an ionic surfactant solution will lead to a reduced $a_0$ due to compression of the electrical double layer. The reduction of $a_0$ will promote change in the shape of the micelle from spherical to cylindrical. For polyoxyethylene (POE) nonionic surfactants, an increase in temperature also cause a change in shape due to increased dehydration of the POE chain.

Microemulsions

To effectively displace the oil in the capillaries of reservoir rocks, IFT of $10^{-3}$ mN/m is generally required, and microemulsion phase behavior is often studied to design surfactant formulations with such ultralow IFT. A microemulsion is an isotropic liquid mixture of oil, water and surfactant, in thermodynamic equilibrium. Dependent on types and concentrations of surfactants and co-surfactants, species of oil, salinity and hardness of water, and temperature, different type of microemulsions may form among oil/water/surfactant system.

Winsor I-type microemulsions are oil-in-water microemulsions, in that oil is solubilized in normal micelles in the water phase. Winsor II-type microemulsions are water-in-oil microemulsion, in that water is solubilized in reverse micelles in the oil phase. Winsor III-type microemulsions, also known as middle phase microemulsions, are characterized by a bi-continuous structure containing most of the surfactant in equilibrium with both excess water and excess oil phase. Winsor III microemulsions solubilize roughly equal volumes of oil and brine.

Hydrophilic-Lipophilic Deviation

Phase behavior of water, oil and surfactant is one of the most important factors that determine the efficiency of chemical flood using surfactants. In order to describe the behavior of surfactant induced microemulsions, a model called the hydrophilic-lipophilic deviation (HLD) model was proposed to measure the departure from optimum formulation. For ionic surfactants, HLD is written as:

$$HLD = \ln S - K^* EACN - f(A) + Cc - \alpha T \Delta T \quad (9)$$

where S is the salinity of the system in grams of electrolyte per 100 ml, k is an empirical constant, EACN is the equivalent alkane carbon number of the oil phase, Cc is a constant characterizing the hydrophilicity/lipophilicity of the surfactant, f(A) is a function of added alcohol, $\alpha_T$ is an empirical constant, and $\Delta(T)$ is the temperature deviation from a reference temperature of 25° C. Negative, zero, or positive HLD values indicate the formation of Winsor I, Winsor III or Winsor II microemulsions, respectively.

Surfactant flooding has been shown to be a technically viable method based on extensive laboratory efforts and numerous pilot tests; however, large field scale implementations have yet to be realized due to the complexity of chemical flooding design and in many instances excessive adsorption of surfactant on formation rocks which adversely challenges economic viability of the projects. The adsorption of surfactant onto reservoir rock materials is a complex function of surfactant type, equivalent weight, and concentration; in-situ mineral composition, and clay content; reservoir temperature; and flow rate of the solution. Mechanisms of anionic surfactants adsorb onto the solid substrates from aqueous solution can in general be categorized as: ion exchange, ion pairing, hydrophobic bonding, adsorption by polarization of electrons, and adsorption by dispersion forces.

A large volume of literature has documented that surfactant adsorption onto reservoir rock material can vary from 0.2 mg/g to as high as 1.0 mg/g (mass of surfactant per mass of rock). A substantial adsorption loss of surfactants onto the mineral surface could drastically increase the required weight of surfactant to achieve ultralow IFT and lead to a huge wastage of chemicals as well as manpower, thereby costing both time and money in an oil field operation. Thus, a proper control of adsorption of surfactant in chemical flooding is of great importance to achieve a successful recovery operation.

Additionally, surfactant is seldom used alone in a chemical flooding operation. Typically, a combination of a surfactant slug and a subsequent polymer slug (SP) are injected into an oil reservoir to provide both microscopic displacement efficiency as well as macroscopic sweep efficiency. However, operation with multiple slugs inevitably adds to the technical complexity of an operation, such as problematic formulation compatibility with high salinity brine (e.g.

TDS>150,000 ppm in Texas and Oklahoma fields) area, as well as huge chemical costs. Thus, a single-step process of injecting a displacing agent that offers both the ultra-low interfacial tension and highly favorable mobility characteristic would be of great interest for oilfield applications.

Alternatives for reducing surfactant adsorption loss and improving sweep efficiency in conventional surfactant flooding process would be highly desirable. Thus, the present disclosure is directed to improvements in fluids and methods used in surfactant flooding processes for EOR, i.e., tertiary oil recovery, in oil fields.

DETAILED DESCRIPTION

Figure 1A:
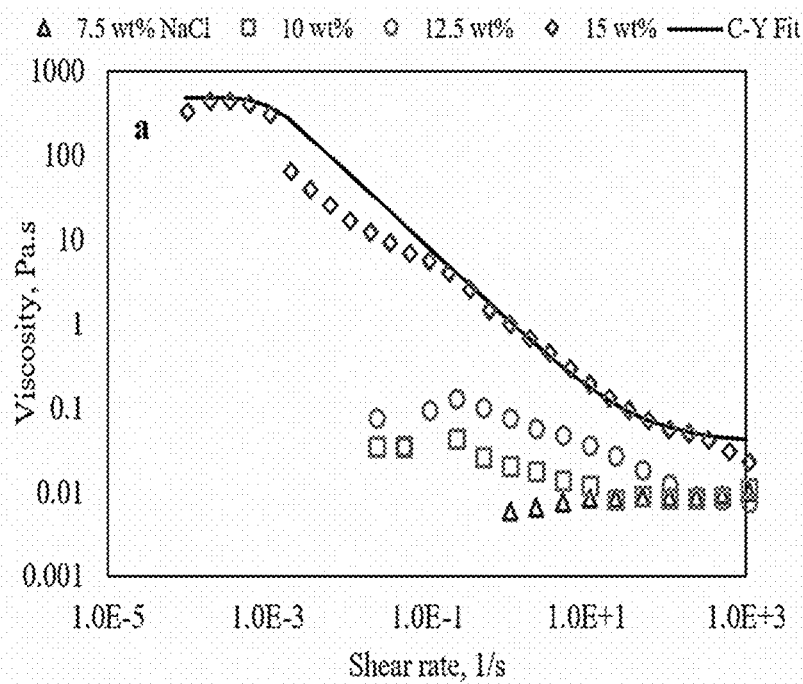
FIG. 1A shows steady shear viscosity as a function of shear rate for 10 wt % $C_8P_4E_1$ solution at various concentration of salt. ($C_8P_4E_1=C_8O(C_3H_6O)_4(C_2H_4O)SO_4Na$).

In at least certain embodiments, the present disclosure is directed to novel highly viscoelastic emulsions formed from microemulsions comprising one or more extended surfactants (e.g., sodium alkyl alkoxy sulfates). The microemulsions are oil-induced and comprise a wormlike micellar solution. In one embodiment for example, a single slug of the oil-induced viscoelastic formulation comprising an emulsion formed from an oil-starved Winsor III microemulsion can be used as an alternative fluid for surfactant flooding. Wormlike micellar solution blends are important for industrial products where the high viscosity and elastic properties are exploited. However, conventional wormlike surfactant micelles are extremely susceptible to oils. For example, solubilization of paraffinic oils inside the micelle core leads to a disruption of wormlike micelles and loss of viscoelasticity. Contrary to typical oleo-responsive wormlike micelles in which the "worms" breakdown upon the addition of oil, the surfactant formulations of the present disclosure are highly stable and have an exceptional viscoelastic behavior in oil-induced wormlike micellar solution. This novel surfactant formulation, which does not include polymer, can improve both the volumetric sweep efficiency and microscopic displacement efficiency. Injection of a single viscoelastic slug of the presently disclosed formulation, instead of multiple slugs as in traditional SP flooding, saves both operating time, labor expense, and chemical expenses for tertiary oil recovery operations, all factors which are highly relevant to a successful oilfield operation. The oil-induced viscoelastic emulsions described herein can be used in various reservoir applications, such as proppant carrying fluids in hydraulic fracturing, and chemical slugs with built-in viscosity control in enhanced oil recovery.

The viscoelastic emulsions of the present disclosure may be used as consumer products, such as in personal care products, home care products, and cosmetics. For example, the viscoelastic emulsion can be used as a thickening agent. For example, in a conventional shower gel or liquid detergent, the surfactant must comprise up to about 10 wt % to build up an adequate viscosity without addition of other thickeners, e.g., polymer. However, using the presently disclosed viscoelastic emulsions, an adequate viscosity can be achieved with as little as 2-5 wt % of surfactant. The viscoelastic emulsions of the present disclosure may be used as drag reducing agent, as delivery vehicle in cosmetics, and as a delivery vehicle for pharmaceuticals.

Extended surfactants are a class of surfactants containing intermediate polarity molecules, such as one or more propylene oxide (PO) moieties ($C_3H_6O$), optionally one or more ethylene oxide (EO) moieties ($C_2H_4O$), which are inserted between a hydrocarbon tail and a hydrophilic head. In various non-limiting embodiments of the formulations of the present disclosure, the extended surfactants may be anionic sulfate surfactants, such as monoalkyl branched propoxy sulfates and alkyl propoxy ethoxy sulfates. In various non-limiting embodiments of the formulations of the present disclosure, the extended propoxy ethoxy surfactant may have the formula $R_1$—O—$(PO)_m$-$(EO)_n$—XY, where $R_1$ is a linear or branched alkyl radical, or an alkenyl radical containing from 6 to 24 carbon atoms, m has an average value in a range of about 1 to about 20, n has an average value in a range of about 0 to about 20, X is a sulfate, sulfonate, phosphate, or carboxylate group, and Y is a monovalent or divalent cation, X can be a cation selected from, but not limited to, alkali metals such as sodium ($Na^+$), potassium ($K^+$), and lithium ($Li^+$), alkaline earth metals such as calcium ($Ca^{++}$), barium ($Ba^{++}$), and magnesium ($Mg^{++}$), amines including alkanol amines and their oxyalkylated adducts, and ammonium. The extended surfactants of the present disclosure generally are not a pure substances in the strict sense, but actually constitute mixtures of components distributed such that m and n are the resulting average values. In various non-limiting embodiments of the formulations of the present disclosure, the alkyl propoxy ethoxy sulfates may have the formula $R_1$—O—$(PO)_m$-$(EO)_n$—$SO_4Na$, where $R_1$ comprises a linear or branched alkyl containing 6 to 24 carbon atoms, m=1 to 20 (e.g., 1-6), and n=0 to 20 (e.g., 0-6). Na may be replaced by K, Li or any other appropriate positively-charged ion as noted above.

Extended surfactants which can be used in embodiments of the present disclosure include, but are not limited to, ALFOTERRA® surfactants, sold by Sasol North America, Inc., and include those shown or described in U.S. Pat. Nos. 4,293,428, and 5,135,052, each of which is hereby incorporated by reference herein in its entirety.

Before further describing various embodiments of the compositions and methods of the present disclosure in more detail by way of exemplary description, examples, and results, it is to be understood that the embodiments of the present disclosure are not limited in application to the details of methods and compositions as set forth in the following description. The embodiments of the compositions and methods of the present disclosure are capable of being practiced or carried out in various ways not explicitly described herein. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description. While the compositions and methods of the present disclosure have been described in terms of particular embodiments, it will be apparent to those of skill in the art that variations may be applied to the compositions and/or methods and in the steps or in the sequence of steps of the method described herein without departing from the spirit, and scope of the inventive concepts as described herein. All such similar substitutes and modifications apparent to those having ordinary skill in the art are deemed to be within the spirit and scope of the inventive concepts as disclosed herein.

All patents, published patent applications, and non-patent publications referenced or mentioned in any portion of the present specification are indicative of the level of skill of those skilled in the art to which the present disclosure pertains, and are hereby expressly incorporated by reference in their entirety to the same extent as if the contents of each individual patent or publication was specifically and individually incorporated herein.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

As utilized in accordance with the methods and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error for the composition, the method used to administer the composition, or the variation that exists among the objects, or study subjects. As used herein the qualifiers "about" or "approximately" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example. The term "about" or "approximately", where used herein when referring to a measurable value such as an amount, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art. As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. A range of 1 to 20 includes, for example, the numerals 1, 2, 3, 4, 5, 6, 7, 8, 9, 10, 11, 12, 13, 14, 15, 16, 17, 18, 19, and 20, and fractions between each integer, such as indicated above. A range of 6 to 24 includes, for example, the numerals 6, 7, 8, 9, 10, 11, 12, 13, 14, 15, 16, 17, 18, 19, 20, 21, 22, 23, 24, 25, and 26, and fractions between each integer, such as indicated above.

Where used herein, the term "microemulsion" refers to a thermodynamically stable dispersion. Microemulsions of the present disclosure are formed using an extended surfactant having a formula as described herein. The term "emulsion" refers to a mixture which is not thermodynamically stable. The novel viscoelastic emulsions of the present disclosure comprise oil-starved Winsor III-type microemulsion into which an excess quantity of oil has been dispersed. Upon settling, the viscoelastic emulsion separates into these two components, an oil-starved Winsor III-type microemulsion phase, and a separate excess, non-dispersed oil phase.

The term "Winsor I-type microemulsion" (or Winsor I microemulsion) refers to an oil-in-water microemulsions, in that oil is solubilized in normal micelles in the water phase. The term "Winsor II-type microemulsion" (or Winsor II microemulsion) refers to a water-in-oil microemulsion, in that water is solubilized in reverse micelles in the oil phase. The term "Winsor III-type microemulsion" (or Winsor III microemulsion) is also known as a middle phase microemulsion and refers to a microemulsion of oil and water which is characterized by a bi-continuous structure containing most of the surfactant in equilibrium with both excess water and excess oil phase. Winsor III microemulsions solubilize substantially equal amounts of oil and brine.

The viscoelastic emulsions of the present disclosure are formed with a quantity of oil that results in an emulsion that, when allowed to coalesce undisturbed for a period of weeks or months, separates into just two phases: a first phase comprising an oil-starved, Winsor III microemulsion, and a second phase comprising a quantity of excess, unsolubilized oil. In the original, non-coalesced, viscoelastic emulsion, this quantity of excess oil remains dispersed throughout the emulsion. The viscoelastic emulsions disclosed and claimed herein, do not, upon coalescing, form a three-phase Winsor III microemulsion (upper or oil phase/intermediate microemulsion phase/lower or aqueous phase). During production of the mixtures of the present disclosure, formation of the "oil-starved" viscoelastic emulsion can be tested by sampling the production stream and allowing the sample to rest undisturbed for a period of minutes or hours, (such as but not limited to the range of from 5 minutes to 60 minutes to 6 hours to 12 hours to 24 hours to 48 hours to 72 hours to 144 hours or more). If the sample coalesces to form three phases, including an intermediate Winsor III microemulsion, an oil phase, and an aqueous phase, then an excessive amount of oil has been combined with the brine and surfactant. The brine, surfactant, and oil streams must be adjusted so that relatively less oil is added to the surfactant/brine mixture, or so that more surfactant/brine is added to the oil, until the "oil-starved" condition is arrived at, wherein the viscoelastic emulsion remains stable for an extended period of time.

Because the salinity in the viscoelastic emulsion is at or near the optimal salinity of the crude oil (target oil) in the reservoir, the target oil is released from the porous medium of the reservoir when it is contacted by the viscoelastic emulsion. Because the viscosity of the target oil is less than the viscosity of the injected viscoelastic emulsion, the target oil does not mix (to a significant extent) with the oil in the viscoelastic emulsion, but instead forms a growing oil-bank ahead of the advancing emulsion, enabling the target oil to be more easily removed from the reservoir.

An oil-starved microemulsion can be defined, in one embodiment, as a microemulsion containing less oil than the maximum amount of oil that could be solubilized into the microemulsion. Thus, an oil-starved Winsor III microemulsion can be defined, in one embodiment, as a Winsor III microemulsion containing less oil than the maximum amount of oil that could be solubilized into a regular, 3-phase, Winsor III microemulsion. This maximum amount of oil can be approximated as the product of the solubilization parameter of the surfactant in the microemulsion and the mass of surfactant in the microemulsion. The solubilization parameter of the surfactant can be determined from measuring the volume of oil solubilized into a Winsor Type III microemulsion, and dividing that volume of oil by the mass of surfactant in the microemulsion. The viscoelastic emulsions of the present disclosure thus contain solubilized oil in an amount that is less than the solubilization capacity of the corresponding Winsor III microemulsion, but greater than the solubilization capacity of the oil-saturated Winsor Type I microemulsion into which the excess oil is to be dispersed. It is possible to determine that the amount of dispersed oil exceeds that required to make the viscoelastic microemulsion if on coalescence of the dispersed oil there is a spontaneous formation of a Winsor III microemulsion in equilibrium with an unsolubilized oil phase and an unsolubilized water phase.

The term "unconventional reservoir", where used herein, refers to a reservoir that requires special recovery operations, e.g., hydraulic fracturing, that are outside conventional operating practices. Examples of unconventional reservoirs include tight-gas sands, gas and oil shales, coalbed methane, heavy oil and tar sands, and gas-hydrate deposits.

In one embodiment, the EACN of an oil can be calculated by comparing the NaCl concentration required for the oil to form a Winsor III microemulsion, and comparing that NaCl concentration (also referred to as salinity) to the Alkane Carbon Number (ACN) of the pure alkane that makes a Winsor III microemulsion at the same salinity. The salinity at which the Winsor III microemulsion forms is referred to as the "optimal salinity" because that is the salinity at which the interfacial tension between the oil and the water is ultralow, e.g., less than $10^2$ mN/m. Optimal salinity can be calculated from the hydrophilic/lipophilic deviation (HLD) equation, (see Eqn. 11 above). As noted above, S is the salinity of the aqueous phase in grams of NaCl per 100 ml of $H_2O$, K and Cc are empirical constants measured for each surfactant, and $a_T$ is the temperature coefficient for the system. The salinity at which HLD=0 is called the optimal salinity, S*. An EACN of a crude oil (for example) can be determined by experimentally determining the salinity, S, at which HLD=0, then identifying the pure alkane, e.g., octane or decane, that has the same S* as the crude oil. The ACN of the pure alkane (e.g., 8 for octane or 10 for decane) is then assigned as the EACN of the crude oil. It is not a requirement that the EACN of solubilized/dispersed oil in the viscoelastic emulsion be the same as the EACN of the target oil to be displaced from the reservoir, however in certain embodiments, the EACN of the emulsion oil and the target oil are similar or approximately the same, for example, a carbon number of about 2, or within about 25%, or 20%, or 15%, or 10% of each other. In at least one embodiment, the viscoelastic emulsion provides an ultralow interfacial tension (IFT) with the target oil, wherein S=S* for the target oil, providing an HLD between 0 and −1 for the surfactant system and the target oil.

Returning to the discussion of several embodiments of the present disclosure, in the present work, the rheological properties of an extended surfactant, a sodium alkyl propoxy ethoxy sulfate, $C_8$—O—$(PO)_4$-$(EO)_1$—$SO_4Na$, i.e., $CO(C_3H_6O)_4(C_2H_4O)SO_4Na$, was extensively investigated as a function of the presence of various paraffinic oils and under a range of salt conditions. The addition of as small as 3 volume percent (vol %) alkane into the surfactant formulations (2 weight percent (wt %)) promotes a sudden shift in viscoelastic behaviors, e.g. solution viscosity jumps 5 orders of magnitude. Oscillatory-shear (frequency sweep) measurements are performed on the viscoelastic samples and solid-like behaviors (G'>G") are observed for all solubilized oil samples in the entire frequency region (0.01-100 rad/s). Commonly, alkanes are believed to be encapsulated in the core of micelles, leading to a radial growth of the cylindrical part of the wormlike micelle resulting in a drop in end-cap energy ($E_C$) and micelle length; in this study, however, the high zero-shear viscosity and plateau G' reveal that solubilized oil induces the axial growth of wormlike micelle, consistent with the long relaxation time observed for solubilized oil samples (G', G" cross over is not obtained within a frequency region of 0.01-100 rad/s). The viscosity of oil solubilized samples eventually decreases with an increase of incorporated oil volume. When the volume of solubilized oil is held constant, (6 vol %), the viscosity increases when the counterions concentration rises but the formulation stays within the Winsor Type III region. Without wishing to be bound by theory, we hypothesize that this "abnormal oleo-responsive" viscoelastic behavior is related to a spacer of intermediate hydrophilicity, i.e., a polypropylene oxide segment, being inserted between the $C_8$ hydrophobic tail and hydrophilic head (the ethoxylated sulfate segment) of the extended surfactant. The addition of oil extends the PO groups and enlarges the tail length, which would result in an increasing end cap energy of worms, thus give rise to a favorable longitudinal growth of wormlike micelles.

Wormlike micelles are elongated, semi-flexible surfactant aggregates which exhibit remarkable rheological properties. Above a critical concentration c*, wormlike micelles entangle into a transient network and become viscoelastic, similar to a solution of flexible polymers. In contrast to polymers, wormlike micelles are dynamic systems that constantly break and recombine, therefore they are often referred to as "living polymers". For wormlike micelles, the spontaneous curvature of the end caps is higher than the curvature along the cylindrical body. The growth is therefore a consequence of the system minimizing the excess free energy by reducing the number of end caps. Over the past few decades, Wormlike micelles have drawn considerable interest both from a theoretical viewpoint as well as for industrial and technological applications. Understanding the viscoelasticity of wormlike micelles is important for the design and the development of industrial products where the high viscosity and elastic properties are exploited, such as fracture fluids in oil fields, drag reduction agents, home care, personal care and cosmetic products.

Wormlike micelles are highly responsive to multiple factors, such as light, temperature, pH, $CO_2$, and hydrocarbons. For oilfield application, the responsiveness to hydrocarbons is of particular importance because that large amounts of hydrocarbons will lead to a drop of viscosity of wormlike micellar solutions by several orders of magnitude and a complete loss of viscoelastic properties. Typically, addition of oil influences the growth of wormlike micelles differently dependent on the type of oils being added. Aromatic hydrocarbons are often solubilized at or near the micellar corona, as a result induces the growth of wormlike micelles in length and, hence, the viscosity enhancement. On the opposite, alkane oils are normally solubilized inside the micellar cores, instead of contribute to the entangled worms, they lead to a disruption of wormlike micelles and their transition to microemulsion droplets. As seen before, 0.5 wt % dodecane is able to render a drastic drop in viscosity of wormlike micellar solution up to 5 orders of magnitude. Increasing the alkyl chain of ester oils has seen worsen the longitudinal micellar growth into worms. Reservoir hydrocarbon typically contains a large portion of paraffinic oils, to generate wormlike micelles resistant to paraffins therefore is of great significance for reservoir applications.

As noted, in the present work, the rheological property of a micellar solution consisting of the extended surfactant $CO(PO)_4(EO)_1SO_4Na$ (also referred to herein as $C_8P_4E_1$) was extensively studied. Wormlike micelles were evidenced at salt level above 15 wt %, and at $C_8P_4E_1$ concentration above 4 wt %. Impact of paraffinic oil was then investigated by solubilizing certain concentration of oils into the 2 wt % $C_8P_4E_1$ solution at Winsor III region, the oil-free solution behaves like Newtonian fluid with viscosity of 0.005 Pa·s. Contrary to common oleo-responsive wormlike micelles, addition of oil could drastically increase the viscosity as well as elasticity of $C_8P_4E_1$ solution. Impact of the oil volume, counterion type, and counterion concentration were also examined. Without wishing to be bound by theory, it is believed that incorporating oil into the spacer layer where PO groups reside can extend the PO groups and enlarge the tail length. This would result in an increasing end cap energy of worms, thus give rise to a favorable longitudinal growth of wormlike micelles.

In various non-limiting embodiments, the fluids of the present disclosure comprise mixtures containing at least one extended surfactant in a range of about 0.1 wt % to about 10 wt % or more of the mixture, a salt in a range of about 0.1 wt % to about 30 wt % of the mixture, an oil in a range of about 0.1% to about 40 wt % of the mixture, with the balance (about 25 wt % to about 99.7 wt %) comprising water, and which comprise a viscoelastic emulsion that does not, upon coalescing, form a three-phase Winsor III microemulsion (upper or oil phase/intermediate microemulsion phase/lower or aqueous phase). The fluids can be injected into wells for tertiary oil production (i.e., EOR). Non-limiting examples of salts that can be used in the fluids include sodium chloride, potassium chloride, calcium chloride, and magnesium chloride, and any other type of salt able to form a viscoelastic emulsion in accordance with the present disclosure. Oils that can be used in the fluids include, but are not limited to, alkane oils, such as octane, decane, and dodecane, and synthetic oils such as Isopar L, and any oil able to form a viscoelastic emulsion in accordance with the present disclosure. In other embodiments, the present disclosure is directed to fracking fluids designed for use in the completion of oil wells which have undergone fracturing operations. The fracking fluids comprise a viscoelastic emulsion as described herein, combined with a proppant, such as sand (or any suitable proppant material). The fracking fluid may comprise from about 0.2 pounds to about 10 pounds of proppant per gallon (24 g to 1198 g proppant per liter) of the viscoelastic emulsion described herein. In use, the fracking fluid is introduced into the well under pressure and left in situ for a predetermined "shut-in" period. In at least certain embodiments, the fluids of the present disclosure are absent or substantially absent, gelling agents (e.g., polymers) typically used to cause gelling of the fluid, and are absent or substantially absent, gelling agent breakers ("gel-breakers") which function to decompose said gelling agents after polymerization or cross-linking. The viscoelastic emulsion fluids of the present disclosure can also be used to suspend and/or disperse nanoparticles. Such formulations can be used to form stable suspensions and/or dispersions of nanoparticles for use in products such as, but not limited to, paints and inks, and for use in industries such as environmental remediation, and oil and gas fields. The types of nanoparticles that can be used include, but are not limited to, carbon nanotubes, carbon black, zero valent iron, metal oxide, silicas, and titania. The concentration of nanoparticles in the fluids can vary from 0.0001 wt % to 60 wt %, or more.

In one non-limiting embodiment, the viscoelastic emulsion contains (1) 1.0-10 wt % extended surfactant, $R_1O(C_3H_6O)_m(C_2H_4O)_nXY$, (2) 2-10 vol % of oil, (3) 3-30 wt % of salt, with rest being water, where $R_1$, m, n, X, and Y are as defined above.

Particular examples of viscoelastic emulsions in accordance with the present disclosure include, but are not limited to:

(a) 1.5 wt % $C_8O(C_3H_6O)_4(C_2H_4O)_1SO_4Na$, 3 vol % Isopar L, 19.3 wt % NaCl, with rest being water.

(b) 2 wt % $C_8O(C_3H_6O)_4(C_2H_4O)_1SO_4Na$, 4 vol % Kerosene, 19.0 wt % NaCl, with rest being water.

(c) 2 wt % $C_8O(C_3H_6O)_4(C_2H_4O)_1SO_4Na$, 4 vol % Crude oil A, 16.0 wt % NaCl, with rest being water.

(d) 3 wt % $C_8O(C_3H_6O)_4SO_4Na$, 6 vol % Isopar L, 19.3 wt % NaCl, with rest being water.

(e) 3 wt % $C_{10}O(C_3H_6O)_4SO_4Na$, 6 vol % Isopar L, 16.8 wt % NaCl, with rest being water.

(f) 3 wt % $C_{10}O(C_3H_6O)_4(C_2H_4O)_1SO_4Na$, 6 vol % Isopar L, 17.2 wt % NaCl, with rest being water.

(g) 2 wt % $C_{12-13}O(C_3H_6O)_8SO_4Na$, 4 vol % Ioapr L, 4.5 wt % NaCl, with rest being water.

(h) 1.4 wt % $C_8O(C_3H_6O)_4(C_2H_4O)_1SO_4Na$, 0.6 wt % $C_{12-13}(C_3H_6O)_8SO_4Na$, 4 vol % Ioapr L, 15 wt % NaCl, with rest being water.

(i) 1.3 wt % $CO(C_3H_6O)_4(C_2H_4O)_1SO_4Na$, 0.7 wt % $C_{20}H_{37}NaO_7S$ (sodium dioctyl sulfosuccinate, commonly known as AOT), 4 vol % Ioapr L, 8 wt % NaCl, 2 wt % $CaCl_2$, with rest being water.

Examples

The embodiments of the present disclosure, having now been generally described, will be more readily understood by reference to the following examples and embodiments, which are included merely for purposes of illustration of certain aspects and embodiments of the present disclosure, and are not intended to be limiting. The following detailed examples of systems and/or methods of use of the present disclosure are to be construed, as noted above, only as illustrative, and not as limitations of the disclosure in any way whatsoever. Those skilled in the art will promptly recognize appropriate variations from the various structures, components, compositions, procedures, and methods.

Materials and Methods

The extended surfactant $C_8O(PO)_4-(EO)_1—SO_4Na$ ($C_8P_4E_1$) used in this study was provided by Sasol North America Inc., Lake Charles, La. as a 32.3% active solution. A synthetic isoparaffinic hydrocarbon solvent, Isopar™-L (>98% $C_{11}$-$C_{13}$) was provided by ExxonMobil Chemical Company, Houston, Tex. Octane (>99.5%), decane (>98%), dodecane (>99%), sodium chloride, potassium chloride, magnesium chloride, and calcium chloride dihydrate ($CaCl_2.H_2O$) were purchased from Sigma Aldrich. All the chemicals were used as received.

Phase Behavior of Microemulsions

Phase behavior test was performed in flat-bottom glass vials with Teflon-lined screw caps. Equal volume of 2 wt % surfactant solution and oil (5 mL each) were added into the vial with different electrolytes concentration. All test tubes were first gently hand-shaken for 20 seconds, and subsequently kept in a water bath at 25° C. to allow equilibrium. After the systems reached equilibrium, the resulted interfacial tension between the excess water and excess oil phases of microemulsions was measured at 25° C. with a M6500 Spinning Drop Tensiometer (Grace Instrument, Houston, Tex.).

Rheological Measurements

Rheological measurements were performed on a Discovery Hybrid Rheometer (DHR-2, TA Instruments) with a temperature-controlling Peltier unit and a sample cover to minimize evaporation. For highly viscous and viscoelastic samples, a cone-plate geometry with 40 mm diameter and 2° cone angle was used, whereas for low-viscous samples, the experiments were performed with concentric cylinders (bob diameter 27.98 mm, cup diameter 30.33 mm). Samples for rheological measurements were vortex mixed and equilibrated for 10 minutes in the measurement cell prior to investigation. Two types of rheological measurements were performed: steady shear-rate viscosity measurements and oscillatory shear measurements. In oscillatory shear measurements, the stress amplitude was chosen in the linear viscoelastic regime as determined by dynamic stress sweep measurements to ensure that the storage modulus (G') and the loss modulus (G'') are independent of the applied stress. Measurements were carried out in duplicates or triplicates for each sample, with very good reproducibility. The results reported here are examples of typical data obtained, not averages.

Results

Rheology of Oil-Free $C_8P_4E_1$ Surfactant Solution

It is well known that wormlike micelles entangle into a transient network, imparting remarkable viscoelastic properties to the surfactant solutions once the surfactant is above a system-dependent concentration, referred to as the overlap concentration. The growth of wormlike micelles can also be promoted by the addition of co-surfactants or other low-molecular weight additives, such as short chain alcohols, counterions, salts and oppositely charged surfactants. Firstly, we investigated the impact of salt on the rheology of surfactant solutions at a constant $C_8P_4E_1$ concentration of 10 wt %.

Flow curves were fitted to the Carreau-Yasuda model, $$\eta(\dot{\gamma}) = \eta_\infty + (\eta_0 - \eta_\infty)[1 + (\lambda\dot{\gamma})^a]^{\frac{n-1}{a}} \quad (10)$$

where $\eta_0$ is the zero-shear-rate viscosity and $\eta_\infty$ the infinite-shear rate viscosity. $\lambda$ is the relaxation time, i.e., the reciprocal of critical shear rate $\dot{\gamma}_c$. For $\dot{\gamma}<\lambda^{-1}$, the Carreau-Yasuda fluid exhibits, essentially, a Newtonian behavior with the viscosity $\eta_0$, while for higher shear rates its viscosity drops to $\eta_\infty<\eta_0$. The Carreau-Yasuda model contains two constants: the power-law index n<1 that characterizes the degree of shear-thinning of the model and the constant a that sets the size and curvature of the crossover region between the Newtonian and shear-thinning behavior.

As can be seen in FIG. 1A, at salinity of 7.5 wt %, the $C_8P_4E_1$ solution behaves like Newtonian fluid; viscosity is 0.009 Pa·s independent of the shear rate. With 10 wt % and 12.5 wt % salt, $C_8P_4E_1$ solutions exhibited rise in viscosity with reducing of shear rate when 100 s$^{-1}$>$\dot{\gamma}$>0.1 s$^{-1}$, but maximum viscosities only around 0.1 Pa·s at $\dot{\gamma}$<0.1 s$^{-1}$ suggesting the absence of entangled wormlike micelles; for $\dot{\gamma}$>100 s$^{-1}$, viscosity leveled off again at 0.009 Pa·s. At higher salt concentration of 15 wt %, the zero-shear viscosity $\eta_0$ (determined by Careau-Yasuda model) reached 480 Pa·s, almost five orders of magnitude higher than that of the 7.5 wt % scenario, undoubtedly manifested the change in the microstructure of the $C_8P_4E_1$ solution. Above a critical shear rate $\dot{\gamma}_c$ of 0.001 s$^{-1}$, the rheological behavior then becomes shear-thinning, as a consequence of alignment of the wormlike chains in the shear flow.

At no or low salt condition, electrostatic repulsive force between identically charged surfactant head groups stop them from approaching each other too closely at the micelle/water interface. As a result, the micelle maintained a relatively rigid configuration, e.g., spherical packing structure. The micelle geometry can be estimated by critical packing parameter, CP, which is defined as $v/(a_s l_c)$, where v is the volume of the lipophilic chain having maximum effective length $l_c$, and $a_s$ is the effective area per molecule at the surfactant-water interface. For CP<⅓, spherical aggregates are expected; for ⅓<CP<½, surfactants would assemble into rodlike (or wormlike) micelles; whereas for CP>½, lamellar structures should form spontaneously. PO groups reside between hydrophobic tail and hydrophilic head group of $C_8$—$(PO)_4$-$(EO)$—$SO_4Na$ molecule; the insertion of such functional groups led to a remarkably bulkier effective head area. For instance, head area of surfactant $C_{12}$-EO—$SO_4Na$ is reported as 0.44 nm$^2$ in 0.1 M (0.58 wt %) NaCl solution, while effective head area of $C_8$—$(PO)_4$-$(EO)_1$—$SO_4Na$ was determined as 1.39 nm$^2$ in deionized water, and 0.68 nm$^2$ in 5 wt % NaCl solution, undoubtedly manifesting the contribution from PO groups. Comparing PO and EO, the former one behaves more lipophilic, attributed more to the tail rather than the surfactant head. The total number of carbon atoms in the tail chain is 20 ($C_8$—$(PO)_4$). There are only 4 oxygen atoms in the tail (compared to 20 carbon atoms), therefore in terms of tail geometry, we can safely ignore the impact of oxygen atoms. Tail volume is then approximated by v=27.4+26.9n Å$^3$, and tail length by $l_c$≤1.5+1.265n Å, where n is the number of carbon atoms of the chain embedded in the micellar core, i.e., 20 in $C_8P_4E_1$. Calculated result is summarized in Table 1.

TABLE 1

$C_8P_4E_1$ head area and critical packing parameter at different NaCl concentrations

| NaCl, wt % | $a_s$, nm$^2$ | CP |
|---|---|---|
| 0 | 1.392 | 0.15 |
| 5 | 0.681 | 0.31 |
| 10 | 0.531 | 0.39 |
| 15 | 0.479 | 0.44 |

CP of $C_8P_4E_1$ falls into the spherical micelle region at salt concentration ≤5 wt %. While with increase of additional electrolytes to 10 wt %, electrostatic repulsion was largely screened due to compression of electrical double layer. A consequent smaller head area thus led to a larger packing parameter, and rodlike micelle formed in this region. While maximum solution viscosity was only 0.1 Pa·s at 10 wt %, as observed in FIG. 1A, which indicates that rodlike micelles were not able to entangle into a transient network due to unfavorable length growth. With further increase of salt to 15 wt %, micelles then grew into 'polymer-like' elongated and flexible aggregates, namely wormlike micelles. In this region, the spontaneous curvature of the end caps is higher than the curvature along the cylindrical body, such length growth is favored for the system to minimize the excess free energy by reducing the number of end caps.

Figure 1B:
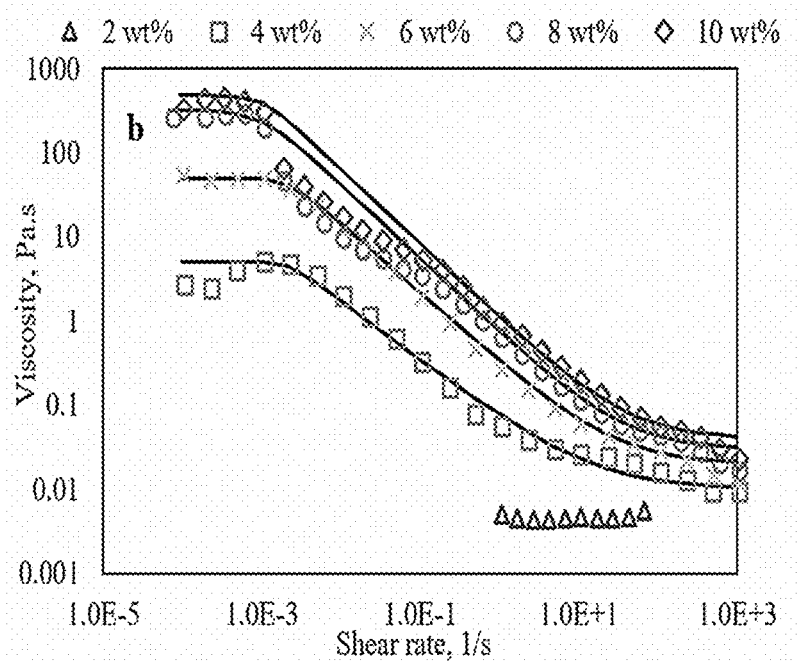
FIG. 1B shows steady shear viscosity as a function of shear rate for solutions of $C_8P_4E_1$ at various concentration of $C_8P_4E_1$ with 15 wt % salt.
Figure 1C:
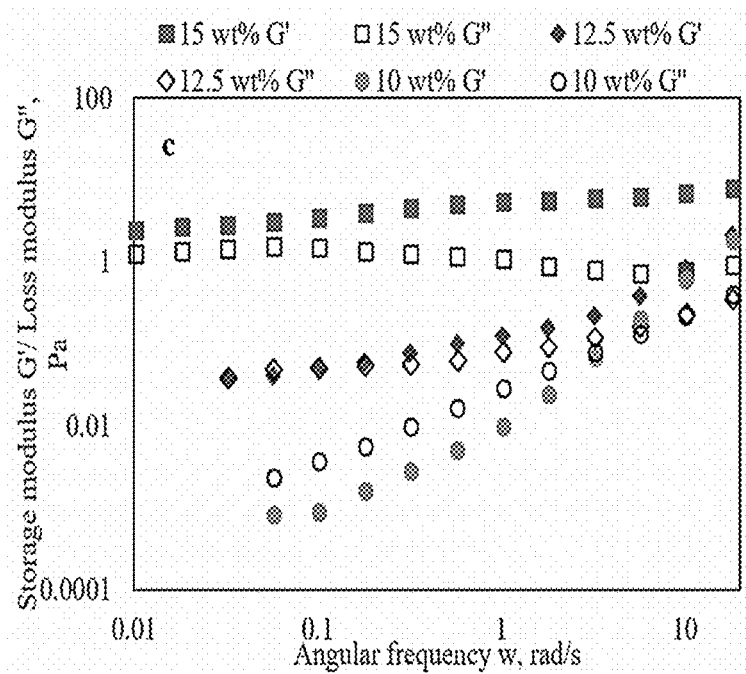
FIG. 1C shows variation of storage modulus G' (filled symbols) and loss modulus G" (open symbols) as a function of oscillatory shear frequency for solutions of 10 wt % $C_8P_4E_1$ at various concentration of salt.

Evolution of microstructure in the solution was also supported by the change of storage modulus (G') and loss modulus (G") in oscillatory frequency measurement. As shown in FIG. 1C, liquid-like behavior (G'<G") was observed at salt concentration of 10 wt %; with increase of salt level to 12.5 wt %, $C_8P_4E_1$ solution shows liquid like behavior in the low-frequency region (<0.1 rad/s), whereas solid-like behavior (G'>G") in the high-frequency region (>0.1 rad/s); with further increase salt to 15 wt %, solid-like behavior was dominant for the whole range of frequency measured. Besides, G' at 15 wt % salt shows weak dependence on frequency, only slightly changing from 2.5 Pa to 7.2 Pa across three decades, further confirmed the buildup of microstructure.

Figure 1D:
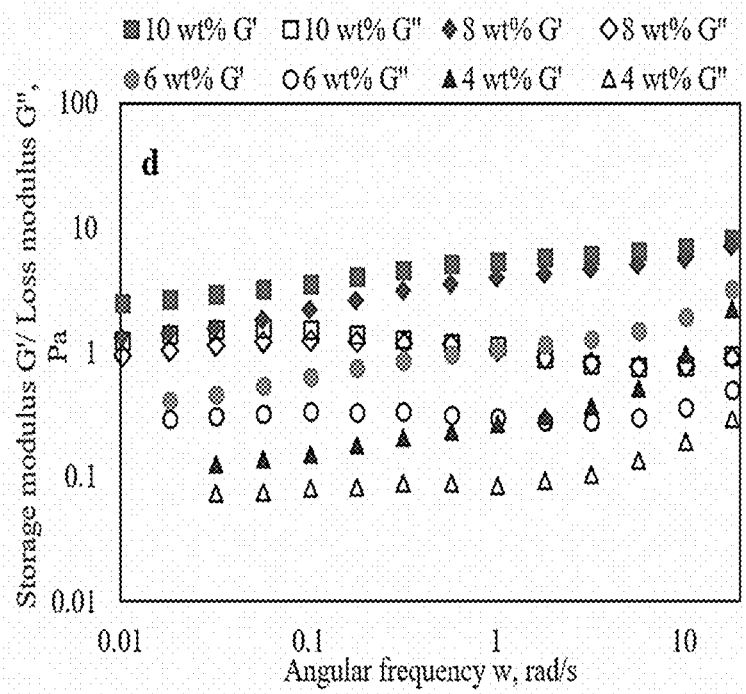
FIG. 1D shows variation of storage modulus G' (filled symbols) and loss modulus G" (open symbols) as a function of oscillatory shear frequency for solutions of $C_8P_4E_1$ at various concentration of $C_8P_4E_1$ with 15 wt % salt.

At constant salt concentration of 15 wt %, effect of $C_8P_4E_1$ concentration was further investigated. As shown in FIG. 1B, Newtonian behavior was observed with a viscosity of 0.005 Pa·s at low $C_8P_4E_1$ concentration of 2 wt %. At $C_8P_4E_1 \geq 4$ wt %, shear viscosities exhibited three sections, a high plateau in low shear rate region ($\dot{\gamma}<0.005$ s$^{-1}$), a shear thinning behavior at intermediate shear rate (200 s$^{-1}>\dot{\gamma}>0.005$ s$^{-1}$), and a second low viscosity plateau at $\dot{\gamma}>200$ s$^{-1}$. The zero-shear viscosity is summarized in Table 2. With increase in $C_8P_4E_1$ concentration, a rise in zero-shear viscosity reflected the one-dimensional micellar growth. FIG. 1D depicts the variation of G' and G" as a function of shear frequency. Solid-like behavior (G'>G") was observed for $C_8P_4E_1$ concentrations between 4-10 wt % in the entire frequency measured.

TABLE 2

Zero-shear viscosity of $C_8P_4E_1$ solution at 15 wt % salinity

| $C_8P_4E_1$ concentration wt % | $\eta_0$ Pa · s |
|---|---|
| 2 | 0.005 |
| 4 | 4.5 |
| 6 | 52 |
| 8 | 320 |
| 10 | 480 |

According to Cates model, stress relaxation in the entangled wormlike micellar solutions is governed by two main processes, 1) reptation, i.e., reptilelike motion of the micelle along a tube, and 2) reversible chain scission, i.e., micelle breaking and recombination through exchange of monomers with other micelles. The relaxation time thus depends on two characteristic time parameters, reptation time $\tau_{rep}$ and breaking time $\tau_{br}$. For a sufficiently entangled system, where reptation is much slower than breaking ($\tau_{br}<<\tau_{rep}$), also known as fast breaking limit, several scission and recombination events take place within the reptation time scale. The viscoelastic behavior of such system follows the Maxwell model of viscoelastic fluids with a single relaxation time, $\tau_R$. For a typical Maxwellian viscoelastic fluid, G" is symmetric near its peak and G' crosses G" at this peak. The reciprocal of the crossover frequency is $\tau_R$, which is given mathematically by $\tau_R=(\tau_{br}\tau_{rep})^{1/2}$.

However, in FIGS. 1C-1D, it is evident that G' and G" responses do not follow that of a Maxwell fluid, i.e., the sample does not have a single relaxation time, but instead has a spectrum of relaxation times. Besides, according to scaling law, dependence of viscosity on surfactant concentration in fast breaking regime obeys $\eta_0 \sim C^{3.7}$. While take the zero-shear viscosity in FIG. 1B as an example, the dependence obeys $\eta_0 \sim C^{5.4}$, which is more consistent with scaling parameter for "unbreakable" regime, that $\eta_0 \sim C^{5.7}$. The "unbreakable" regime, namely, reptation occurs fast enough, so that the micelles do not break and recombine many times during tr. Therefore, reptation is the principal mechanism of stress relaxation. Since reptation time scales with micellar length, $\tau_{rep} \sim L^3$, low $\tau_{rep}$ indicates insufficient contour length of worms.

Microemulsion Phase Behavior

A microemulsion is a thermodynamically stable dispersion of oil-in-water (Winsor I) or water-in-oil (Winsor II), in contrast to a regular or microemulsion, which is a kinetically stabilized, non-equilibrium dispersion. The Winsor III microemulsion contains approximately equal volumes of oil and water, where a bilayer or planar microstructure is assumed. The semi-empirical model, hydrophilic-lipophilic deviation (HLD), correlates the effect of formulation variables such as surfactant type, oil type, temperature and added electrolyte on formation of a Winsor III microemulsion. Negative, zero, or positive HLD values suggest the formation of Winsor Type I, Type III or Type II microemulsions, respectively.

For ionic surfactants, the HLD equation is $$\text{HLD}=\ln(S)-k\cdot\text{EACN}+Cc-f(A)-\alpha_T\Delta(T) \quad (11)$$

where S is the salinity of the system in grams of electrolyte per 100 ml, EACN is the equivalent alkane carbon number of the oil phase, k is an empirical constant measured for the surfactant, and Cc is a constant characterizing the hydrophilicity/lipophilicity of the surfactant. Values of k and Cc for $C_8P_4E_1$ are previously reported as 0.053, and −2.47, respectively. f(A) is a function of added alcohol, $\alpha_T$ is an empirical constant, the temperature coefficient for the system, and $\Delta(T)$ is the temperature deviation from a reference temperature of 25° C. The salinity at which HLD=0 is called the optimal salinity, S*. At the present experimental condition, 25° C., without addition of alcohol, the HLD equation can be simplified as, $$\text{HLD}=\ln(S)-k\cdot\text{EACN}+Cc \quad (12)$$

Optimum salinity S*, is the salt level where by definition HLD=0 and an optimum Type III microemulsion ($V_o=V_w$) is realized. V is the volume of oil in the microemulsion and $V_w$ is the volume of water. Solubilization parameter is defined as the maximum amount of oil (water) solubilized in the microemulsion per unit amount of surfactant, $SPo=V_{oil}/m_S$ ($SPw=V_{water}/ms$).

Figure 2:
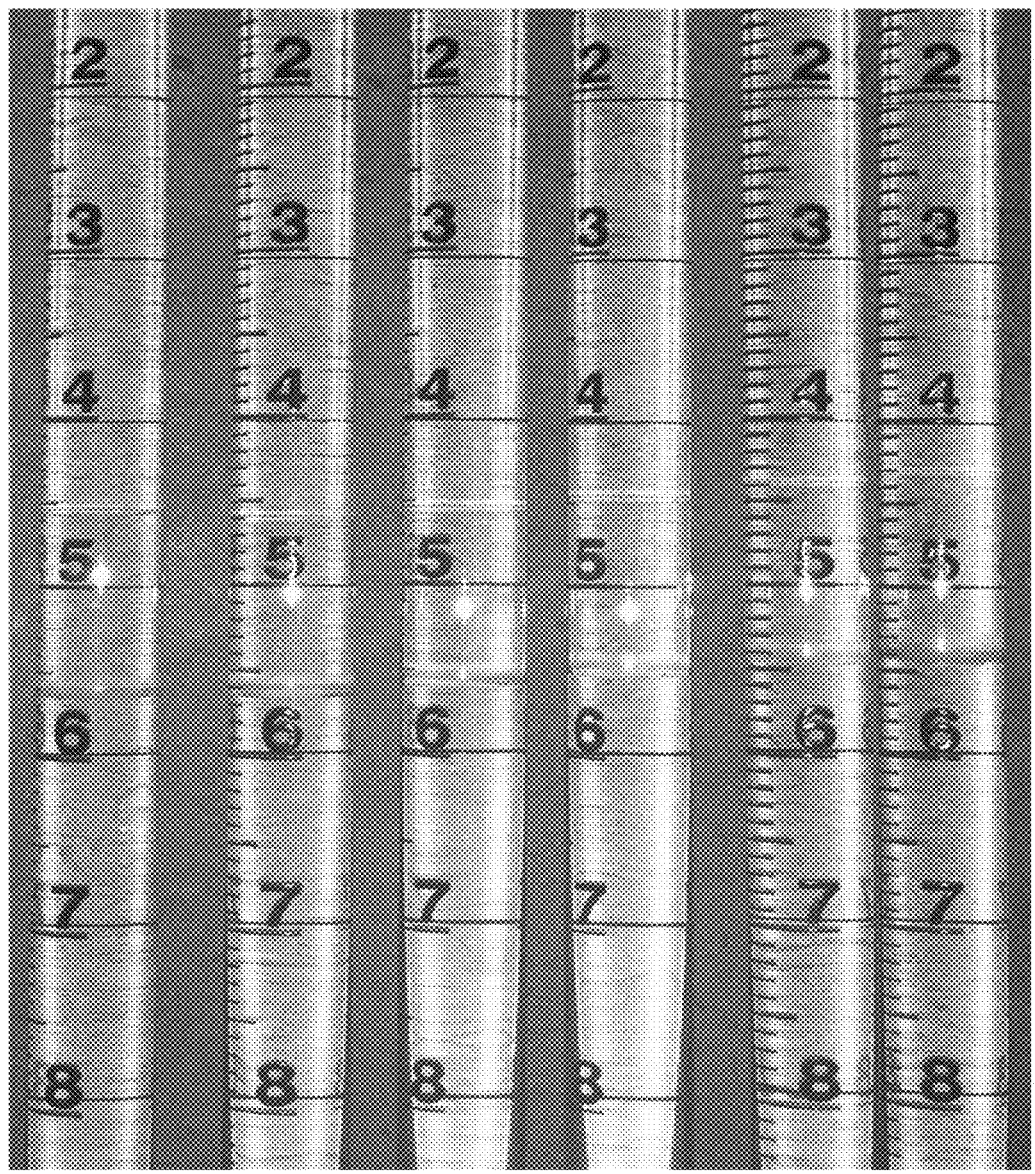
FIG. 2 shows images of a Winsor III microemulsion of 2 wt % $C_8P_4E_1$/Isopar at NaCl concentration from 18.4-19.9 wt %.

Salinity scan was carried out for 2 wt % $C_8P_4E_1$ solutions with different oils and electrolytes. (FIG. 2) shows representative Winsor III microemulsions of $C_8P_4E_1$ and oil Isopar at different NaCl levels. As can be seen, translucent middle phase microemulsions are in equilibrium with clear excess oil and water phases. Optimum salinity S*, of $C_8P_4E_1$/Isopar/NaCl system was determined by interfacial tension measurement. For instance, in FIG. 3, a minimum interfacial tension of 0.003 mN/m was obtained between excess oil and water at 19.0 wt % salinity, in line with identical solubilization parameters of oil and water in microemulsion phase. Optimum salinity of $C_8P_4E_1$/NaCl solutions with different paraffinic oil or $C_8P_4E_1$/Isopar systems with various type of electrolytes are summarized in Table 3.

TABLE 3

| Optimum salinity (S*) | | | | |
|---|---|---|---|---|
| $C_8P_4E_1$/NaCl | | | $C_8P_4E_1$/Isopar | |
| Oil | EACN | S* (wt %) | Electrolyte | S* (wt %) |
| Octane | 8 | 16.3 | NaCl | 19.0 |
| Decane | 10 | 18.4 | KCl | 17.7 |
| Dodecane | 12 | 19.3 | $CaCl_2$ | 20.0 |
| Isopar | 11.4* | 19 | $MgCl_2$ | 21.7 |

(*EACN of Isopar: calculated based on HLD equation)

Rheology of $C_8P_4E_1$ Surfactant Solution with Oil

Figure 4:
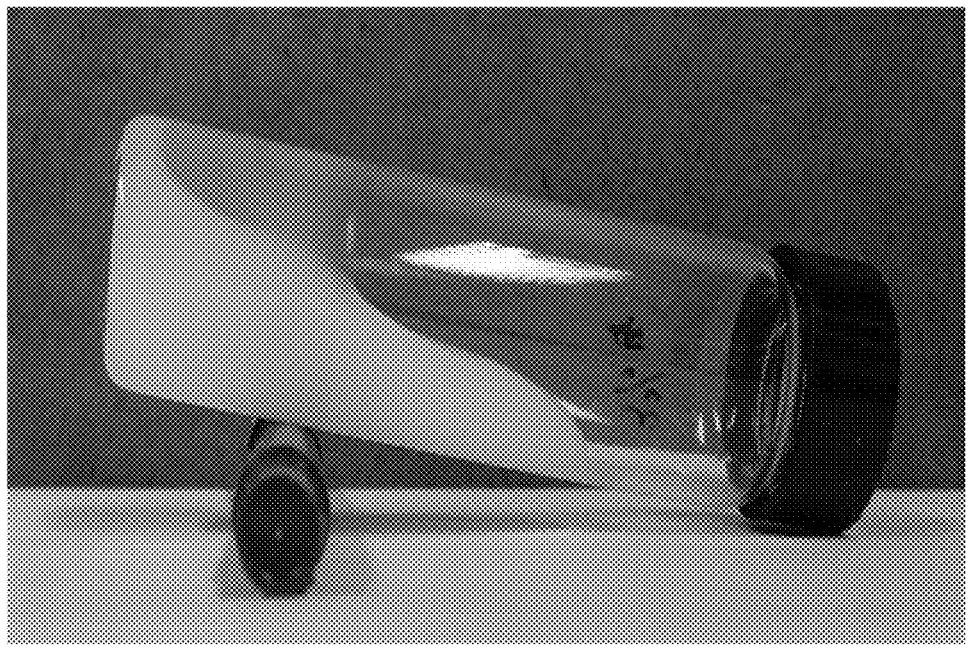
FIG. 4 is a photograph of a tube containing a viscous emulsion formed by 3 vol % of Isopar with 2 wt % $C_8P_4E_1$ solution at 19 wt % NaCl.

Vortex mixing 2 wt % $C_8P_4E_1$ saline solution with a fraction of oil, which formed Winsor III microemulsion at 1:1 volume ratio, can promote a highly viscous solution as shown in FIG. 4. The homogeneous soft-gel like solution is apparently different from common microemulsion systems, which typically have viscosity ranging from few cP to tens of cP. The viscous solution could be formed with oil of wide volume fraction and at different NaCl concentrations, but only within the Winsor III range. Rheology measurements were carried out to further understand these viscous formulations.

Figure 5A:
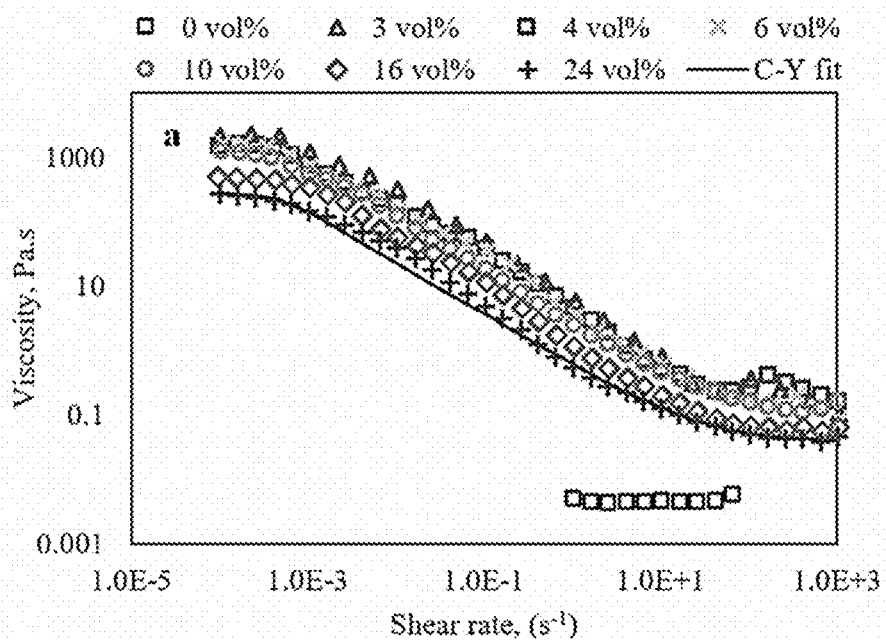
FIG. 5A shows steady shear viscosity as a function of shear rate for 2 wt % $C_8P_4E_1$ solution with various volume of Isopar at optimum salinity of 19 wt % salt.

As seen in FIG. 5A, oil-free $C_8P_4E_1$ solution (2 wt %) exhibited a typical Newtonian fluid behavior with viscosity of 0.005 Pa·s. Addition of oil Isopar has dramatic enhancement in viscosity of the $C_8P_4E_1$ solutions. As mere as 3 vol % Isopar added could induce a highly viscous network and performance. The viscosity approaches a plateau at low shear rate; zero-shear viscosity of 2373 Pa·s is obtained using the Careau-Yasuda model. The resulted $C_8P_4E_1$ solution behaved shear thinning above a critical shear rate around 0.001 $s^{-1}$. The viscosity curve seems plateau at shear rate above 100 $s^{-1}$ but a small leap was also seen for some cases before the onset of second plateau. The reason of the viscosity disturbance is believed due to shear banding. Shear banding is a transition between a homogeneous and a non-homogeneous state of flow, the latter being characterized by a "separation" of the fluid into macroscopic regions (bands) of different shear rates. Shear banding transition has been widely observed for wormlike micellar solutions, which is associated with a plateau in the stress versus shear rate curve. With increasing solubilized oil volume in the $C_8P_4E_1$ solution, a slow decrease on the steady shear viscosity was seen. Nevertheless, the zero-shear viscosity ($\eta_0$) of the oil-induced wormlike micellar solutions has increased at least 4 orders of magnitude (260 Pa·s in 24 vol % oil) compared to the oil-free $C_8P_4E_1$ solution.

Figure 5B:
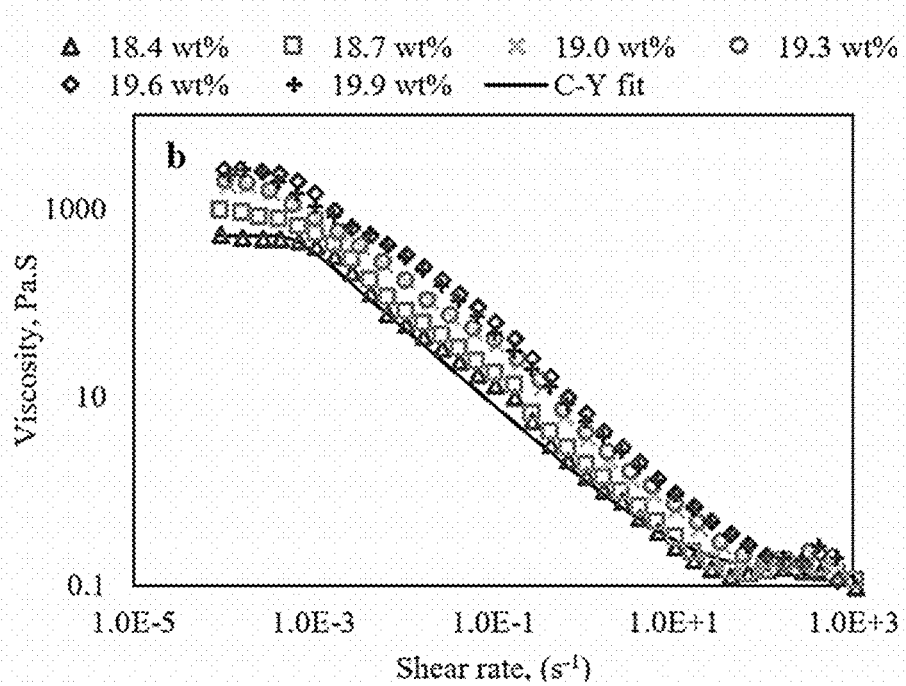
FIG. 5B shows steady shear viscosity as a function of shear rate for 2 wt % $C_8P_4E_1$ solution with 6 vol % of Isopar at different salinity. Carreau-Yasuda model fit only show in 24 vol % Isopar and 18.4 wt % salt scenarios to present data with clarity.

FIG. 5B shows the influence of the salinity change on the viscosity of oil solubilized $C_8P_4E_1$ solutions (6 vol % oil). It should be note that all the salinities presented in FIG. 5B are still within the Winsor III microemulsion range. Three segments were observed, a viscosity plateau at low shear rate; shear thinning behavior at intermediate shear rate; and a second viscosity plateau at high shear rate. The viscosity behavior is similar to a typical shear viscosity curve of a polymer melt, as polymers undergoes entanglement, disentanglement, and eventually orientate along the flow direction with increase of shear rate. With salinity increase from 18.4 to 19.6 wt %, the zero-shear viscosity goes up from 527 to 2737 Pa·s. While at 19.9 wt % salinity, viscosity has slightly dropped to 2509 Pa·s.

Figure 5C:
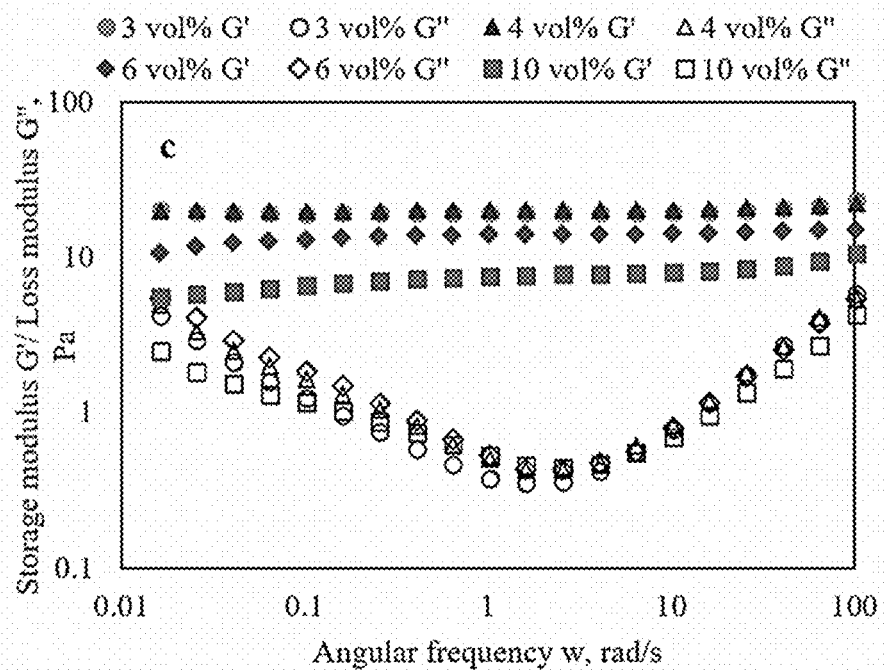
FIG. 5C shows variation of storage modulus G' (filled symbols) and loss modulus G" (open symbols) as a function of oscillatory shear frequency for several solutions of 2 wt % $C_8P_4E_1$ at 19 wt % salt with various volume of Isopar.
Figure 5D:
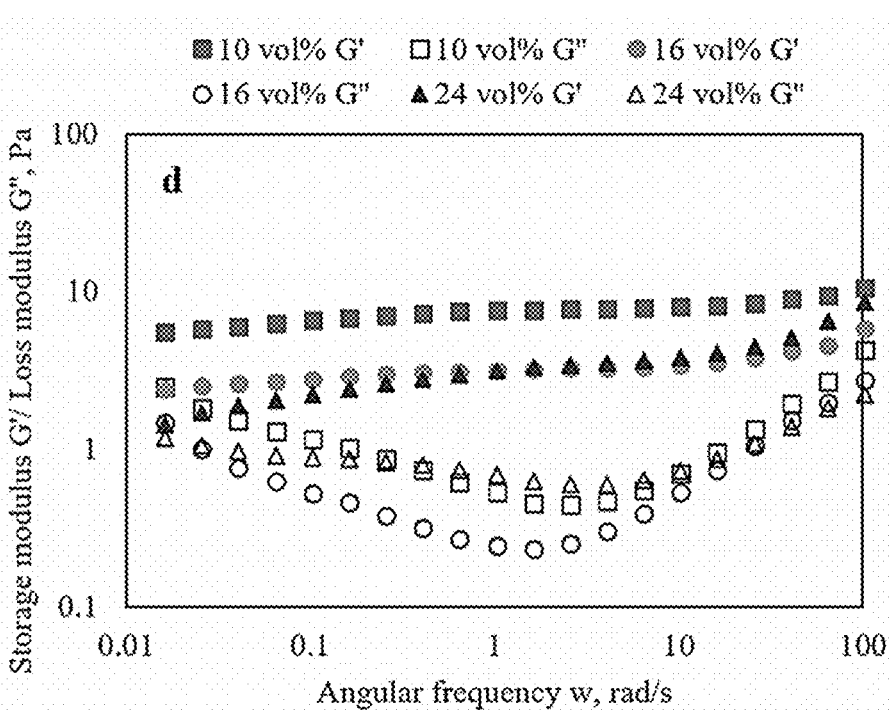
FIG. 5D shows variation of storage modulus G' (filled symbols) and loss modulus G" (open symbols) as a function of oscillatory shear frequency for several solutions of 2 wt % $C_8P_4E_1$ at 19 wt % salt with various volume of Isopar.
Figure 5E:
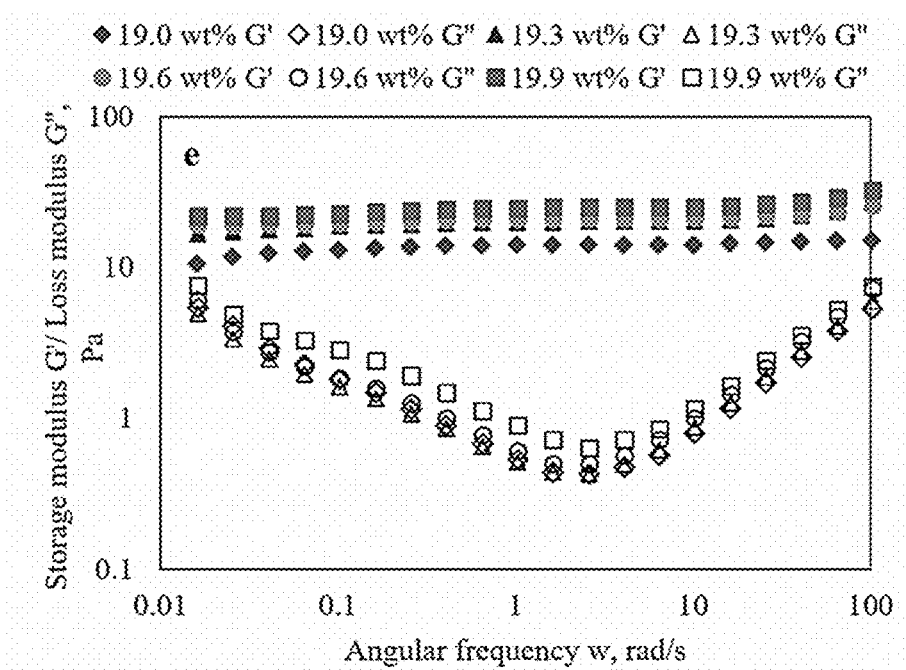
FIG. 5E shows variation of storage modulus G' (filled symbols) and loss modulus G" (open symbols) as a function of oscillatory shear frequency for several solutions of 2 wt % $C_8P_4E_1$ with 6 vol % of Isopar at different salt concentration.
Figure 5F:
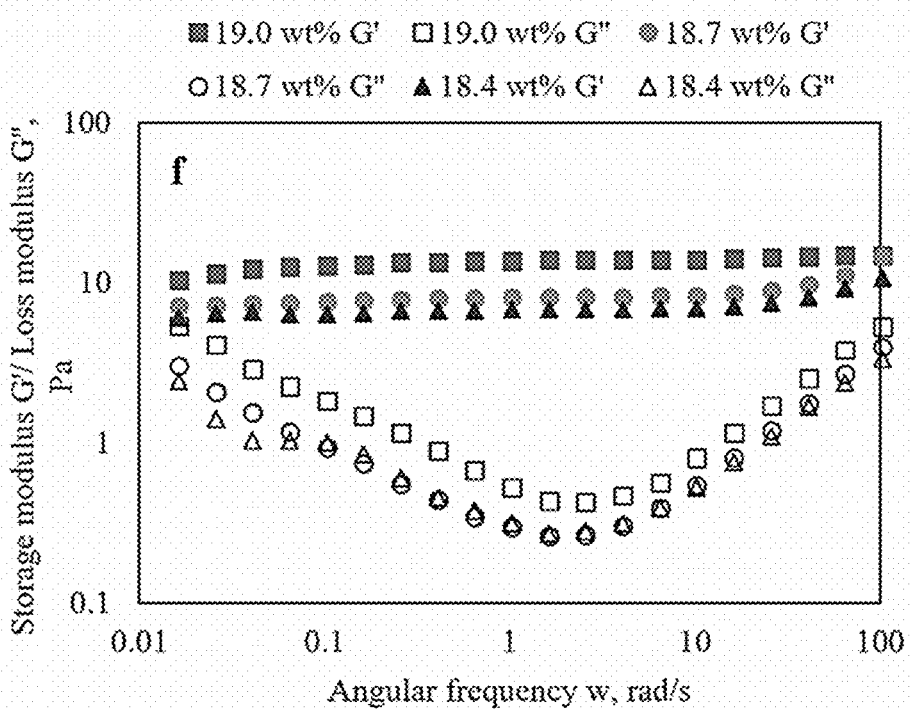
FIG. 5F shows variation of storage modulus G' (filled symbols) and loss modulus G" (open symbols) as a function of oscillatory shear frequency for several solutions of 2 wt % $C_8P_4E_1$ with 6 vol % of Isopar at different salt concentration.

FIGS. 5C-5D exhibit the variation of G' and G" as a function of shear frequency for $C_8P_4E_1$ solutions with oil concentration between 3 vol % and 24 vol %. G' exhibited clear plateaus among all the scenarios tested, while G" showed a funnel shape with minimum between 1 rad/s and 10 rad/s. For instance, in $C_8P_4E_1$ solution with 3 vol % oil, plateau modulus, $G_0$, was 20 Pa, with $G'_{min}$ of 0.36 Pa occurred at 1.58 rad/s. No cross-over point for G' and G" was seen in the frequency range investigated, i.e., 0.01-100 rad/s. Solution with 4 vol % oil behaves as stiff as the solution with 3 vol % oil, with same plateau $G_0$ recorded at 20 Pa. A decrease in $G_0$ was seen with increase of solubilized oil concentration >4 vol % into the $C_8P_4E_1$ solution. Nevertheless, solid-like behaviors (G'>G") were observed for all oil concentrations examined. The rather high viscosities (>200 Pa·s), and distinct plateaus of G' indicated the entangled networks of wormlike micelles. FIGS. 5E-5F exhibit the variation of dynamic shear moduli at various salinity levels. Similarly, solid-like behaviors (G'>G") were observed for all salt concentrations examined without a cross-over point between 0.01-100 rad/s. With rise in the salt concentration from 18.4 to 19.9 wt %, a growth in $G_0$ is observed from 7.0 to 25.7 Pa.

The dominance of G' over G" implied unique elasticity of oil-solubilized $C_8P_4E_1$ solutions. While contrary to a typical elastic gel system, which in essence does not relax, i.e., its relaxation time $t_R$ (and in turn, its zero-shear viscosity $\eta_o$) is infinite,[16] the authors believe the relaxation time of oil solubilized $C_8P_4E_1$ solution should be a finite, yet quite high value. In the rheology measurement, oil solubilized solution did not show a yield stress, which is a characteristic of typical gels and the reason for their infinite viscosity at stagnant situation. Instead, a finite zero-shear viscosity was recorded. Also observing the trend of G' and G" in the oscillatory graph, G" is believed to rise with further reduction in shear frequency, and eventually give rise to a cross between G' and G" at frequency <0.01 rad/s. In turn, an extremely high (>100 s) rather than infinite relaxation time is expected for such gel-like solutions.

The inverse of the critical shear rate γc gives an estimate of the longest micellar structural relaxation time T. In oil solubilized $C_8P_4E_1$ solution, the shear thinning did not appear until shear rate around $4-6 \times 10^{-4}$ $s^{-1}$, which in turn gives $\tau_R$ around 2000 s, obviously exceeding the range of measurements; in the oil-free solution, γc is observed around $1-2 \times 10^{-3}$ $s^{-1}$, resulting in $\tau_R$ around 500-1000 s. In comparison, a typical relaxation time has been reported around 0.1-10 s, of wormlike micellar solution such as sodium laury ether sulfate (SLES), and potassium oleate.

For typical wormlike micellar solutions conforming to Maxwell model, e.g., cetylpyridinium chloride, and hexadecyltrimethylammonium bromide (CTAB), breaking time $\tau_{br}$ has been measured around 0.01-0.1 s. %. $\tau_{br}$>10 s was reported for highly viscoelastic (gel-like) wormlike micellar solution, typically formed with surfactant acquiring an overall tail length of C22 (erucyl tail) or longer. Rheological properties of erucyl tail surfactant has been previously investigated with erucyl bis(hydroxyethyl) methylammonium chloride (EHAC), erucyl dimethyl amidopropyl betaine (EDAB), and 3-(Nerucamidopropyl-N,N-dimethyl ammonium) propane sulfonate (EDAS). It is common that G' shows a plateau extending up to ω~0.01 rad/s at the low end, and G'>G" at entire frequency range by a factor of 10 or more. The long C22 tail was believed to increase hydrophobicity of surfactant dramatically, so that it is unfavorable for C22 surfactant to diffuse through water, either out of a micelle or into another one, therefore leading to several orders of magnitude higher $\tau_{br}$. The extended tail of $C_8P_4E_1$ has in total 20 carbon atoms, though it is smaller than a C22 tail, the breaking of $C_8P_4E_1$ micelles would be a relatively unfavorable process compared to shorter alkyl chain wormlike micelle, e.g., CTAB, thus we can safely assume a $\tau_{br}$= 10 s for $C_8P_4E_1$, similar as erucyl tail surfactant.

Reptation time $\tau_{rep}$ of entangled worms have been estimated from $10^3$ to $10^5$ s. We assume $\tau_{rep}$ of $10^4$ s for $C_8P_4E_1$, and according to $\tau_R=(\tau_{br}\tau_{rep})^{1/2}$ in Maxwell model, $\tau_R$ is therefore calculated around 316 s. This calculated value is close to the $\tau_R$ of EDAB observed in dynamic rheological test, around 200-300 s. Compared to a typical relaxation time of 10 s encountered in wormlike micellar solution, the high relaxation time of EDAB was attributed to a rather long contour length and consequent long reptation time (as $\tau_{rep}\sim L^3$), as well as a larger breaking time. EDAB micellar solutions are, however, extremely oleo-responsive; as little as 0.1% toluene could result in a significant disruption of the network and a decrease in zero-shear viscosity of around 100-fold. Effect of alkane was inspected for wormlike micellar solution of EHAC. Addition of hexane above 0.6 wt % (70 mM) was able to disrupt the plateau modulus, indicating the breaking of the wormlike structure.

A comparison of 3 vol % oil solubilized $C_8P_4E_1$ solution and oil-free solution, higher zero-shear viscosity (2373 Pa·s vs. 0.005 Pa·s) and plateau modulus $G_0$ (20 Pa) unquestionably indicates that solubilized oil induces the growth of wormlike micelle. The primary composition of Isoapr L is essentially a synthetic isoparaffinic hydrocarbon, which contains very low levels of aromatic composition. The equivalent alkane carbon number (EACN) of Isoapr L was determined about 11.4, in other words, it behaves approximate hendecane and dodecane. As opposed to typical alkane oils, which were reportedly solubilized in the core of surfactants micelles thus to shorten the wormlike micelle, the authors believe Isopar oil may be solubilized at the spacer layer where PO groups reside. Presence of POs provide a smooth transition zone between the extremely hydrophilic sulfate headgroup and extremely lipophilic alkyl tail in the interface.

Figure 3:
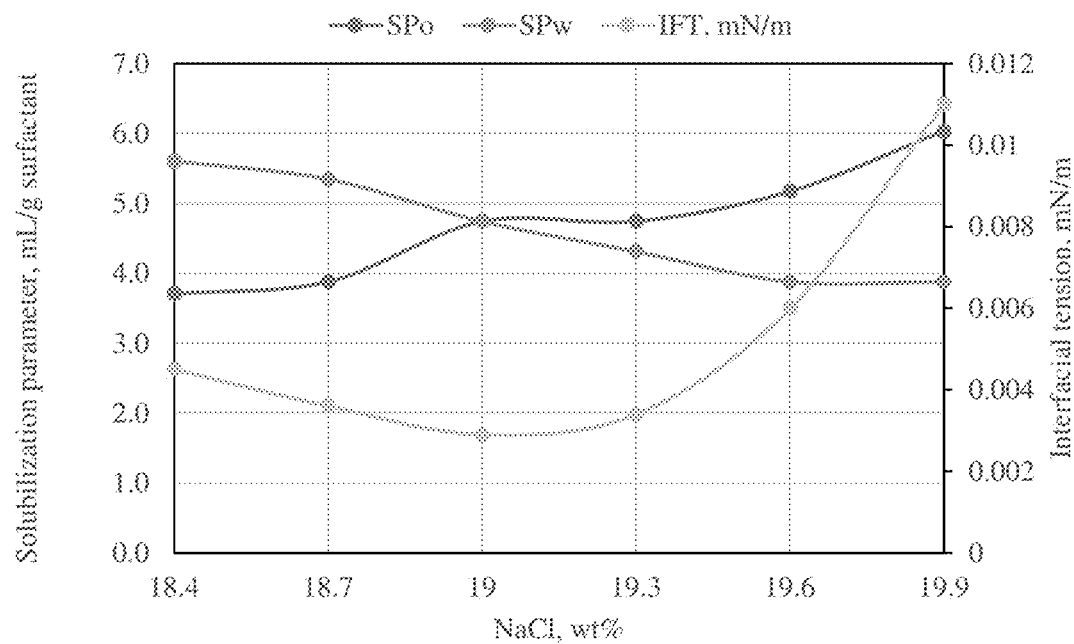
FIG. 3 shows parameters of solubilization and interfacial tension between excess oil and water phases for $C_8P_4E_1$/Isopar/NaCl formulation. A favorable salinity is 19.0 wt %.

In the Winsor III regime, the surfactant has approximately equal affinity to both water and oil. As seen in FIG. 3, 1:1 ratio of oil and water were solubilized by $C_8P_4E_1$ at optimum salinity therefore lead to a planar (bilayer) structure. Without wishing to be bound by theory, it is our hypothesis is that, in the oil solubilized wormlike micellar formulation, $C_8P_4E_1$ micelle may incorporate insufficient oil into the core, thus solubilized oil was not able to swell the micelle core, and lead to a planar structure, i.e., reduce curvature to 0. Instead, oil probably bonds to the spacer layer where PO groups reside. Incorporating of oil into PO groups reveals two-fold impacts, first, fully extend the length of PO groups thus enlarge the tail length; second, truncate the cross-section area of head group, because agglomerated PO groups would otherwise contribute to a bulkier head group, as seen in Gibbs adsorption calculation. Since increase in tail length and decrease in head area would oppose each other in the denominator term in critical packing parameter, CP=v/$(\alpha_s l_c)$, a net effect of these two may have trivial change on packing factor, which is approximate to that of oil-free micelles between ⅓ to ½.

On the other hand, the change in formation energy of end caps can provide an alternative to evaluate the micelle evolution. The free energy per surfactant can be expressed by, $$f = \gamma a\left(1 - \frac{a_0}{a}\right)^2 + f_c \tag{13}$$

where $\gamma$ is the effective surface tension between the hydrophobic core and the surrounding solution, which is often approximated by the water-alkane surface tension $\gamma \approx 0.12$ $k_BT/\text{Å}^2$; a is the surface area per surfactant molecule; $\alpha_0$ is the optimum headgroup area which resulted in a minimum packing free energy; and $f_c$ is the chain contribution to the molecular packing free energy, which is a constant, independent of the aggregation geometry according to the convention that hydrophobic core of amphiphilic aggregates is liquidlike.

For a semi-spherical end cap, $\alpha_{sph}=3v/l_c$, the number of surfactant molecules in one end cap can be approximated by, $$N = \frac{2\pi l_c^2}{a_{sph}} \tag{14}$$

the excess energy per molecule in the end cap is:

$$\Delta f = f_{sph} - f_{cyl} \approx \gamma a_{sph}\left(1 - \frac{a_0}{a_{sph}}\right)^2 \tag{15}$$

then the energy cost $E_c$ of a single end cap (half of scission energy) is expressed as, $$E_c = N\Delta f \approx 2\pi\gamma l_c^2\left(1 - \frac{a_0}{a_{sph}}\right)^2 \tag{16}$$

We assume here, solubilizing small volume of oil into the PO groups only extends the length of PO groups therefore length of the tail but does not change the volume of the hydrophobic tail, in other words, solubilized oil takes the empty space previously inaccessible to alkyl chain due to steric hindrance resulted from bulk PO groups, i.e., $$v = \frac{a_{sph}l_c}{3} = const.$$

Above equation is therefore rewritten as, $$E_c \approx 2\pi\gamma l_c^2\left(1 - \frac{a_0 l_c}{3v}\right)^2 \tag{17}$$

In forming spherical micelle in the end cap, $\alpha_0$ satisfies the condition, $\alpha_0 > 3v/l_c$; in turn, $l_c > 3v/\alpha_0$. Differentiate above equation, $$dE_c/dl_c = 4\pi\gamma l_c\left(1 - \frac{a_0 l_c}{3v}\right)\left(1 - \frac{2a_0 l_c}{3v}\right) \tag{18}$$

When $l_c > 3v/\alpha_0$, we have, $$\begin{cases} 1 - \dfrac{a_0 l_c}{3v} < 0 \\ 1 - \dfrac{2a_0 l_c}{3v} < 0 \end{cases} \tag{19}$$

Thus, $dE_c/dl_c>0$, indicating that $E_c$ is monotonically rising with increase in $l_c$. According to mean-field theory, the average contour length $\bar{L}$ is related to surfactant volume fraction C, end cap energy $E_c$, as well as temperature T by, $$\bar{L} \sim C^{0.5} \exp(E_c/k_BT) \quad (20)$$

Higher end cap energy would lead to a longer contour length. In other words, solubilizing even smaller volume of oil in PO groups, would effectively enlarge the length of surfactant tail, truncate the headgroup area, and lead to a greater end cap excess energy, thus growth of wormlike micelle is favored.

The above estimation of $E_c$ is only viable for solubilizing small volume of oil. With larger volume of solubilized oil, however, a hydrocarbon core (sphere droplet) would form inside the micelle and lead to a swelling end cap. The calculation of $E_c$ of a swelling end cap can be found elsewhere. In short, swelling of end cap would decrease interfacial curvature of micelles and lead to the reduction of the scission energy $2E_c$, therefore growth of wormlike micelle would be restrained.

Figure 6:
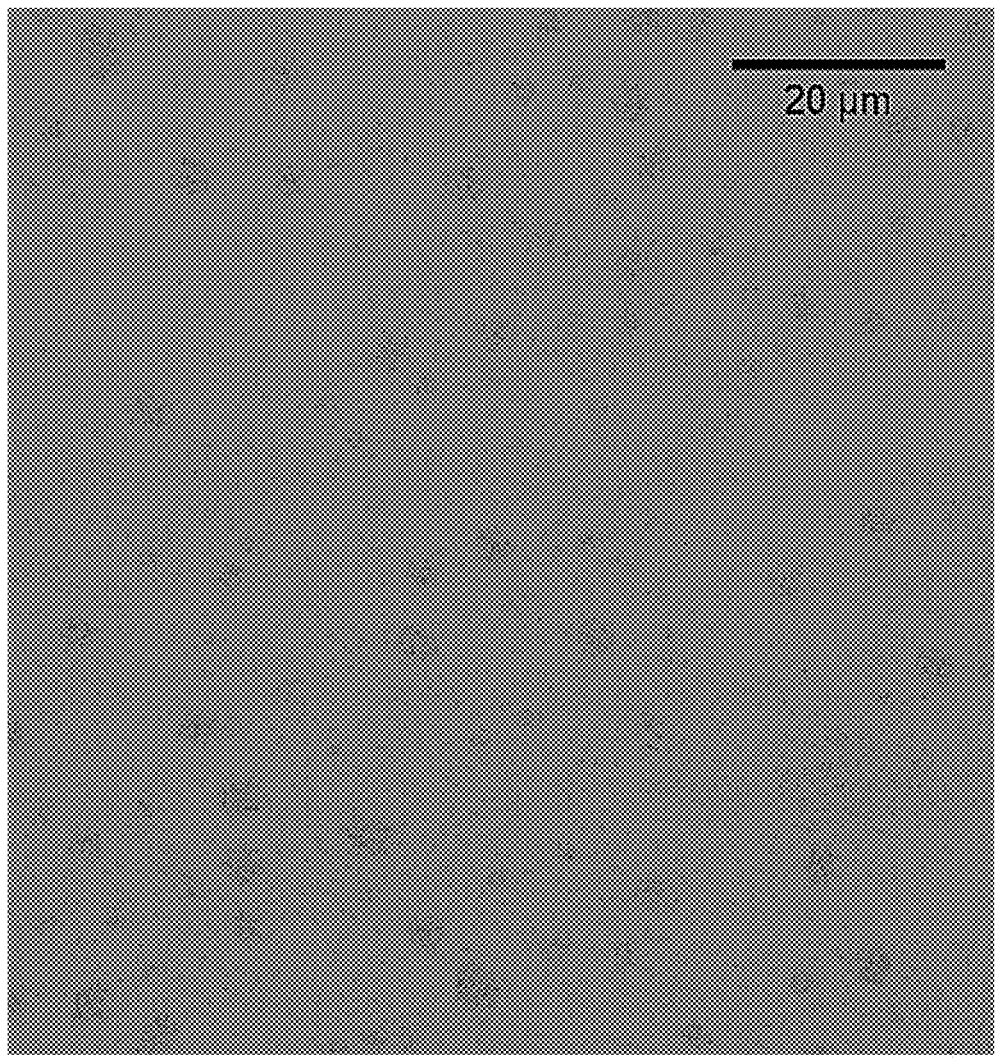
FIG. 6 is a fluorescence image of oil solubilized wormlike micellar solution of 2 wt % $C_8P_4E_1$ with 4 vol % Isopar at 19 wt % salinity. Isopar was dyed by Nile red, as illustrated by magenta color in the image. Giant oil droplets are seen with size ranging from 2-4 μm.

FIG. 6 is a fluorescence image obtained from confocal microscopy for 2 wt % $C_8P_4E_1$ with 4 vol % Isopar at 19 wt % salinity. Isopar was dyed by Nile Red as indicated by the magenta color in the image. Resolution of confocal microscopy is limited to around 100 nm scales, thus it is unable to differentiate the wormlike structure of the sample. Nevertheless, it is effective to visualize the giant oil droplets may evolve in the solution. Some oil droplets are seen sparsely distributed in FIG. 6 with size ranging from 2-4 µm. The presence of oil droplets indicates that reduced end cap energy (due to incorporating oil into the core) eventually lead to giant oil in water dispersion, which obviously impeded the rise of viscosity, also may be a probable reason for the shear banding observed in steady shear viscosity.

As mentioned previously, the viscoelastic $C_8P_4E_1$ emulsion was only induced in an oil-starved $C_8OP_4E_1SO_4$/oil/water system in a Winsor III regime. What does this indicate? In the system other than Winsor III microemulsion, surfactant molecules have unbalanced affinity between oil and water phase. For instance, in the Winsor I region, surfactant has stronger water-surfactant interaction than oil-surfactant interaction. Water molecules hydrated to the head groups (-EO—$SO_4Na$) are sufficient to maintain a rigid micellar interface with a positive curvature. On the other hand, oil-surfactant interaction is relatively weaker. PO groups therefore behaves less lipophilic compared to that in Winsor III region, and agglomerated POs would assume rather than extended structure. Instead of contributing to an enlarged tail, solubilized oil would be directly incorporated into micelle core, thus growing of wormlike micelle is not anticipated. From dynamic light scattering, hydrodynamic diameter of oil swollen micelle was determined around 30-50 nm in Winsor I microemulsion, (octane solubilized by 2 wt % $C_8P_4E_1$ at 13.3-14.4 wt % NaCl), which is obviously larger than twice of fully extended surfactant length (approximate 3 nm) of $C_8P_4E_1$ molecule assuming a tail to tail spherical micelle.

In FIGS. 5C-5F, it is evident, plateau modulus $G_0$ decreases with increase in solubilized oil volume, while increases with rise in the salt concentration in the Winsor III region. In terms of worm structure, $G_0$ is related to the network mesh size of the entangled wormlike micelle $\xi$ by, $$G_0 = \frac{k_BT}{\xi^3} \quad (21)$$

A rise in $G_0$ indicates the decrease in $\xi$, in other words, network structure becomes increasingly tighter. This is consistent with the observation of zero-shear viscosity, that $\eta_o$ reduces with rise in solubilized oil volume but increases with growth of salinity. $\xi$ is related to the persistence length of the micelles, $l_p$, and the entanglement length $l_e$, the average distance along the micelles between two entanglement points in the micellar networks by, $$l_e = \frac{\xi^{5/3}}{l_p^{2/3}} \quad (22)$$

The persistence length, $l_p$, typically ranges from 20 to 50 nm as determined through scattering techniques. We can safely assume $l_p$ is a constant, 30 nm, in our oil solubilized $C_8P_4E_1$ wormlike micelles. The change in the average contour length $\bar{L}$ relative to entanglement length $l_e$ is estimated directly from the rheological data using, $$\frac{\bar{L}}{l_e} \approx \frac{G_0}{G''_{min}} \quad (23)$$

where $G''_{min}$ is the value of the loss modulus at the high frequency minimum. The ratio $$\frac{\bar{L}}{l_e}$$

defines the average number of entanglements per micelle $\xi$, $l_e$, and $\bar{L}$ are calculated based on the measured rheological data.

Figure 7:
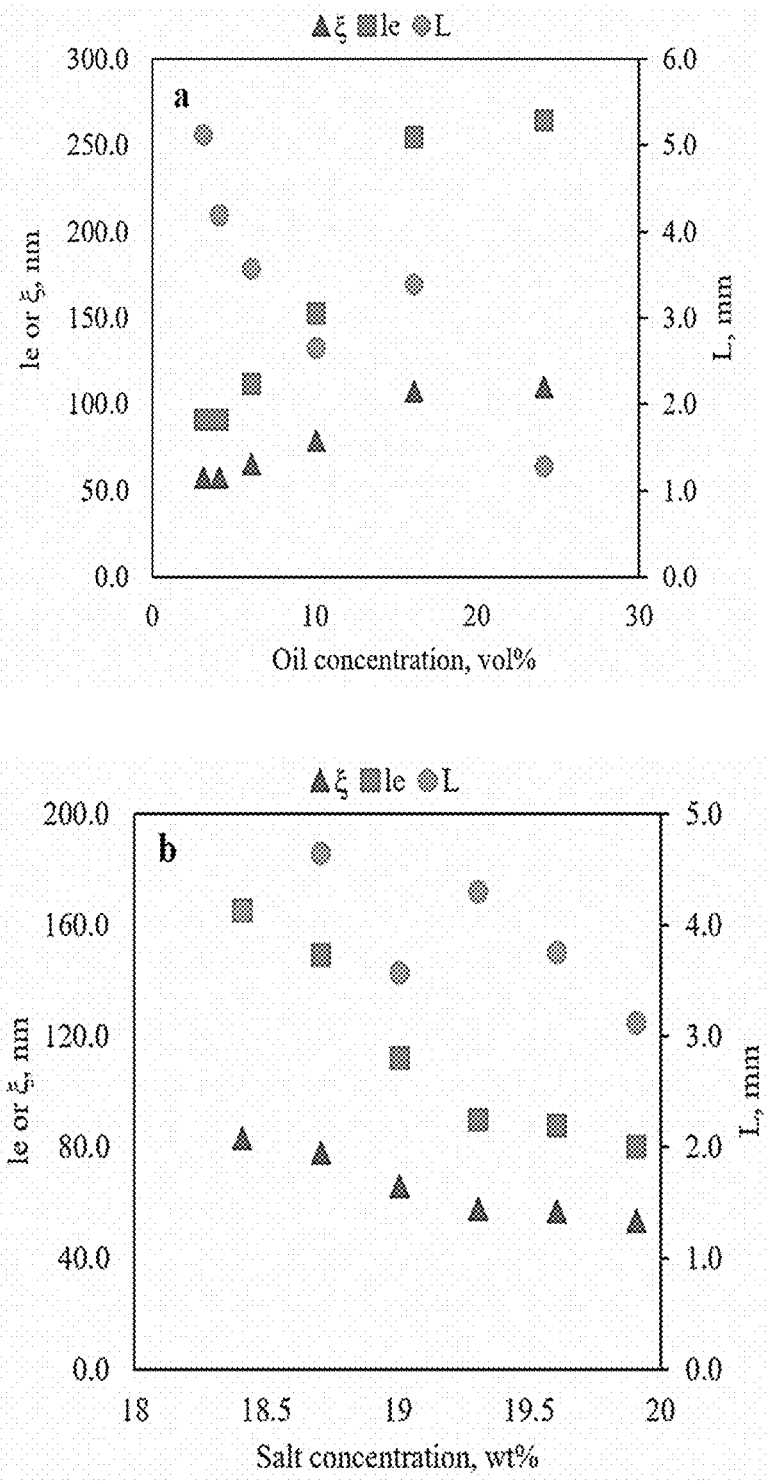
FIG. 7 shows dependence of the network mesh size $\xi$, entanglement length $l_e$, and average contour length of micelles $\bar{L}$ on Isopar concentration (constant salt concentration 19 wt %) (upper panel) and salt concentration (constant oil concentration 6 vol %) for 2 wt % $C_8P_4E_1$ solution at 25° C. (lower panel).

As can be seen in FIG. 7, with rise in the concentration of solubilized oil above 3 vol %, both network mesh size $\xi$, and entanglement length $l_e$ increased, indicating less frequency for worms to get entangled. A reduction on contour length of wormlike micelle from 5.1 to 1.3 µm is seen with oil volume growing from 3 to 24 vol %. While with rise in the salt concentration in the micellar solution, both network mesh size $\xi$, and entanglement length $l_e$ decreased, which means the network structure becomes increasingly stiffer. The change in contour length was less obvious, slightly fluctuating within 4.6 and 3.1 µm. It is needed to note, the contour length of $C_8P_4E_1$ solution was estimated as high as 5 µm, which is around an order of magnitude higher than a typical value of 100-500 nm, being reported for wormlike micelles, such as sodium dodecyl sulfate (SDS), SLES, and CTAB. Details of the characteristic parameters for wormlike micelles are summarized in Table 4. Group A shows results of varying NaCl concentration in 2 wt % $C_8P_4E_1$ solution with 6 vol % Isopar. Group B shows results of varying concentration of Isopar in 2 wt % $C_8P_4E_1$ solution with 19 wt % NaCl. Group C shows results of varying concentration of $C_8P_4E_1$ with 6 vol % Isopar and 19 wt % NaCl. Group D shows results of varying cations (at respective optimum concentration) in 2 wt % $C_8P_4E_1$ solution with 6 vol % Isopar. Group E shows results of varying oils (6 vol %) in 2 wt % $C_8P_4E_1$ solution with NaCl at respective optimum salinity.

TABLE 4

Characteristic parameters obtained from rheological measurements.

| Group | NaCl, wt % | $G_0$, Pa | $\eta_0$, Pa·s | $G''_{min}$ | L/le | ξ, nm | le, nm | L, um |
|---|---|---|---|---|---|---|---|---|
| A | 18.4 | 7.0 | 527 | 0.28 | 25 | 84 | 166 | 4.2 |
|   | 18.7 | 8.4 | 986 | 0.27 | 31 | 79 | 150 | 4.7 |
|   | 19 | 14.3 | 1895 | 0.44 | 33 | 66 | 112 | 3.6 |
|   | 19.3 | 20.7 | 2026 | 0.44 | 47 | 58 | 91 | 4.3 |
|   | 19.6 | 21.7 | 2737 | 0.51 | 43 | 57 | 89 | 3.8 |
|   | 19.9 | 25.7 | 2509 | 0.66 | 39 | 54 | 81 | 3.1 |

| Group | Isopar, vol % | $G_0$, Pa | $\eta_0$, Pa·s | $G''_{min}$ | L/le | ξ, nm | le, nm | L, um |
|---|---|---|---|---|---|---|---|---|
| B | 3 | 20.0 | 2373 | 0.36 | 55.6 | 59 | 93 | 5.1 |
|   | 4 | 20.8 | 1663 | 0.44 | 47.3 | 58 | 91 | 4.3 |
|   | 6 | 14.3 | 1895 | 0.44 | 32.5 | 66 | 112 | 3.6 |
|   | 10 | 8.0 | 1309 | 0.46 | 17.4 | 80 | 154 | 2.7 |
|   | 16 | 3.5 | 532 | 0.24 | 14.6 | 106 | 244 | 3.6 |
|   | 24 | 3.2 | 272 | 0.61 | 5.2 | 109 | 256 | 1.3 |

| Group | $C_8P_4E_1$, wt % | $G_0$, Pa | $\eta_0$, Pa·s | $G''_{min}$ | L/le | ξ, nm | le, nm | L, um |
|---|---|---|---|---|---|---|---|---|
| C | 1.5 | 11.5 | 1154 | 0.31 | 37 | 71 | 126 | 4.7 |
|   | 2 | 14.3 | 1895 | 0.44 | 33 | 66 | 112 | 3.6 |
|   | 3 | 24.9 | 3625 | 0.63 | 40 | 55 | 82 | 3.2 |
|   | 4 | 19.6 | 4262 | 0.7 | 28 | 59 | 94 | 2.6 |
|   | 6 | 22.2 | 3198 | 0.94 | 24 | 57 | 87 | 2.1 |

| Group | cation | $G_0$, Pa | $\eta_0$, Pa·s | $G''_{min}$ | L/le | ξ, nm | le, nm | L, um |
|---|---|---|---|---|---|---|---|---|
| D | $K^+$ | 3.2 | 336 | 0.15 | 21 | 109 | 256 | 5.5 |
|   | $Na^+$ | 14.3 | 1895 | 0.44 | 33 | 66 | 112 | 3.6 |
|   | $Ca^{2+}$ | 8.8 | 678 | 0.28 | 31 | 78 | 146 | 4.6 |
|   | $Mg^{2+}$ | 11.5 | 2443 | 0.27 | 43 | 71 | 126 | 5.4 |

| Group | oil | $G_0$, Pa | $\eta_0$, Pa·s | $G''_{min}$ | L/le | ξ, nm | le, nm | L, um |
|---|---|---|---|---|---|---|---|---|
| E | octane | 5.0 | 420 | 0.24 | 21 | 94 | 200 | 4.2 |
|   | decane | 12.2 | 2337 | 0.31 | 39 | 70 | 122 | 4.8 |
|   | Isopar | 14.3 | 1895 | 0.44 | 33 | 66 | 112 | 3.6 |
|   | dodecane | 7.8 | 1016 | 0.18 | 43 | 81 | 156 | 6.8 |

Without wishing to be bound by theory, it is hypothesized that formation of wormlike micelles (viscoelasticity) when oil is emulsified in an oil-starved $C_8P_4E_1SO_4$/oil/water system is due to the extending of PO groups at optimum Winsor III condition, in essence it is a characteristic of surfactant itself. External physical conditions, such as cation species (impact on head), and solubilized oil (impact on alkyl tail) are not the critical factors governing the formation of wormlike structures, as long as the packing geometry stands, and oil-surfactant-water interaction is balanced (optimum Winsor III microemulsion). The steady shear viscosity, and dynamic shear moduli of 2 wt % $C_8P_4E_1$ solution with constant concentration of various oils (6 vol %), namely, octane, decane, Isopar, and dodecane; and the effect of different cations, such as $Na^+$, K+, $Ca^{2+}$, and $Mg^{2+}$, as well as the impact of $C_8P_4E_1$ concentration on the rheological behavior are thus examined. Results are shown in Table 4.

Divalent cations, $Mg^{2+}$ (2.28 mol/kg) and $Ca^{2+}$ (1.8 mol/kg) are more effective in creating Winsor III microemulsions of $C_8P_4E_1$ compared to monovalent cations $Na^+$ (3.25 mol/kg) and $K^+$ (2.38 mol/kg). Three segments were also observed in shear viscosity for $C_8P_4E_1$ wormlike solutions with different cations. Increase in zero-shear viscosity (both absolute increment as well as increase per mole of cation) was seen following $K^+<Ca^{2+}<Na^+<Mg^2$. For $K^+$, the viscosity is at relatively lower level compared to other three cations, with a zero-shear viscosity of 336 Pa·s. Addition of $Mg^{2+}$ exhibited the highest viscosity, leveled off at 2443 Pa·s. Cation radii follows a reverse trend, $K^+$ (133 μm)>$Ca^{2+}$ (99 μm)>$Na^+$ (95 μm)>$Mg^{2+}$ (65 μm). The change on viscosity is attributed to the strength of interaction between surfactant headgroups and metal cations, that the cation with smaller radius may not only be adsorbed in the interface of the micelles, but also embed around the headgroups. Therefore, smaller cations will compress the area of surfactant headgroups to a great extent and enhance micellar growth.

Among the four species of oils, octane induced $C_8P_4E$ wormlike micelles exhibit apparently lower viscosity compared to other three oils. The shear viscosity as well as the plateau modulus follows octane<dodecane<Isopar≈decane. In terms of shear viscosity and G', Isopar and decane almost overlap with each other, except that Isopar reached a plateau in the low shear rate with a viscosity about 1895 Pa·s, whereas decane has not yet leveled off at the shear rate as low as 0.0001 $s^{-1}$ (the zero-shear viscosity of decane is simply obtained by averaging last 3 data points in the low shear rate). In the microemulsion phase behavior (not shown), octane generates thicker middle phase compared to other three oil, implying stronger oil-$C_8P_4E_1$ interaction. In comparison with other oils tested, molecular structure of octane is identical to the alkyl chain of $CP_4E_1$. This will lead to a favorable interaction (miscible) between tail of $C_8P_4E_1$ and octane, thus octane molecules are more likely to diffuse to the interior of the micelle instead of bonding to the POs, and less tail extension is understandable.

Fixing the amount of solubilized oil (6 vol % Isopar) by varying the concentration of $C_8P_4E_1$ is helpful in determining the optimum ratio of oil/surfactant, where the highest viscosity and modulus may occur. As $C_8P_4E_1$ concentration increase from 1.5 wt % to 3.0 wt %, rise in both $\eta_0$ and $G_0$ manifest a stiffer network of wormlike micelles. While increase $C_8P_4E_1$ concentration from 4 wt % to 6 wt %, both $\eta_0$ and $G_0$ show reduction. The optimum ratio of oil/surfactant is thus calculated around 1.3-1.7 mug (3.0-4.1 molecules of Isopar per molecule of $C_8P_4E_1$), which is obviously less than the optimum solubilization parameter in Winsor III microemulsion, 4.8 mL/g. This confirms insufficient solubilized oil may only bond to POs thus give rise to the growth of wormlike micelles rather than swell the core. At $C_8P_4E_1$ concentration <3 wt %, a higher ratio 2.6-3.4 mL/g indicating more oil may be solubilized into core therefore reduce the end cap energy and impede the build-up of viscosity and storage modulus. With 6 wt % $C_8P_4E_1$, ratio of oil/surfactant is lower, 0.9 mL/g. In this case, oil was fully solubilized into POs to achieve maximum number of extended POs, i.e., maximum worms. The decrease of viscosity is possible due to the branching of worms at high concentration. The branches provide intermicellar junctions, which can effectively slide along the micellar body thus serve as stress-release points. The resulting multi-connected network therefore displays a reduced viscosity compared to entangled micelles.

Implications in Reservoir Application

Oil-induced (or oleo-resistant) viscoelastic behaviors are of great importance for oilfield applications, such as fracking fluid, and surfactant slug in tertiary recovery. In terms of the fracking fluid, using the surfactant-based viscoelastic fluids of the present disclosure provides several advantages over traditional polymer-based viscoelastic fluid. For example, the use of a crosslink breaker which is typically needed to degrade polymer gels is no required. Pore blocking which normally occurs in fracked strata due to the gigantic molecular structure of polymer gels; no longer happens. Most importantly, because the presently disclosed oil-induced viscoelastic fluid is reformed from an oil-starved Winsor III microemulsion, collapse of worms improves the microscopic displacing efficiency due to ultralow interfacial tension between oil and water phase.

Figure 8:
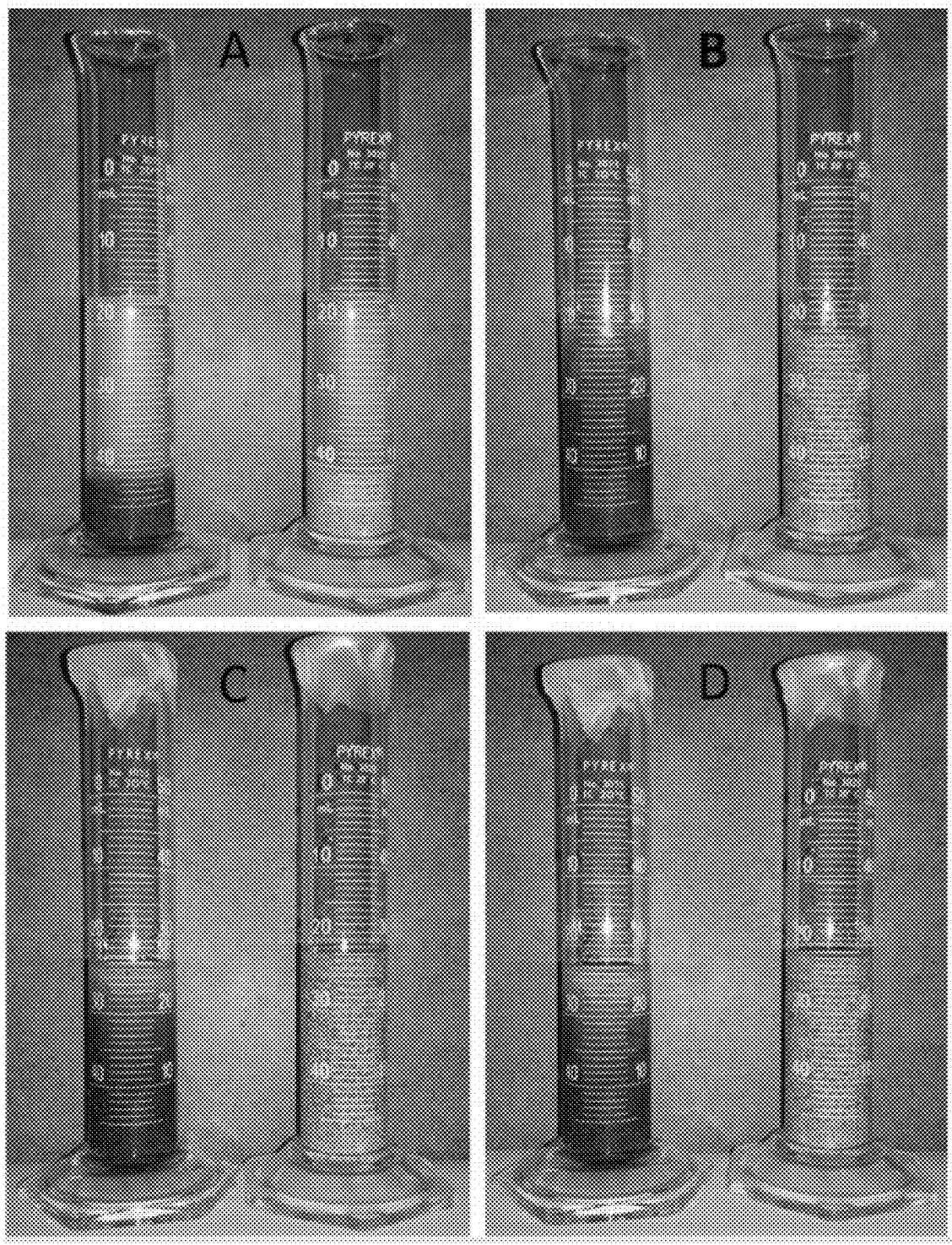
FIG. 8 is a photograph showing proppant carrying performance of viscoelastic fluid. (a) 3 pounds per gallon (0.36 g/mL) of ceramic proppants in 2 wt % $C_8P_4E_1$ solution right after agitation, specific gravity of proppant in left cylinder (black) is 3.2, in right cylinder (gray) is 2.5, both proppants are 20/40 mesh size; (b-d) 3 pounds per gallon (0.36 g/mL) of ceramic proppants in viscoelastic fluid (2 wt % $C_8P_4E_1$ with 3.0 vol % oil) right after agitation (b), after 12 hours of heating at 50° C. (c), and after 24 hours of heating at 50° C. (d).
Figure 9:
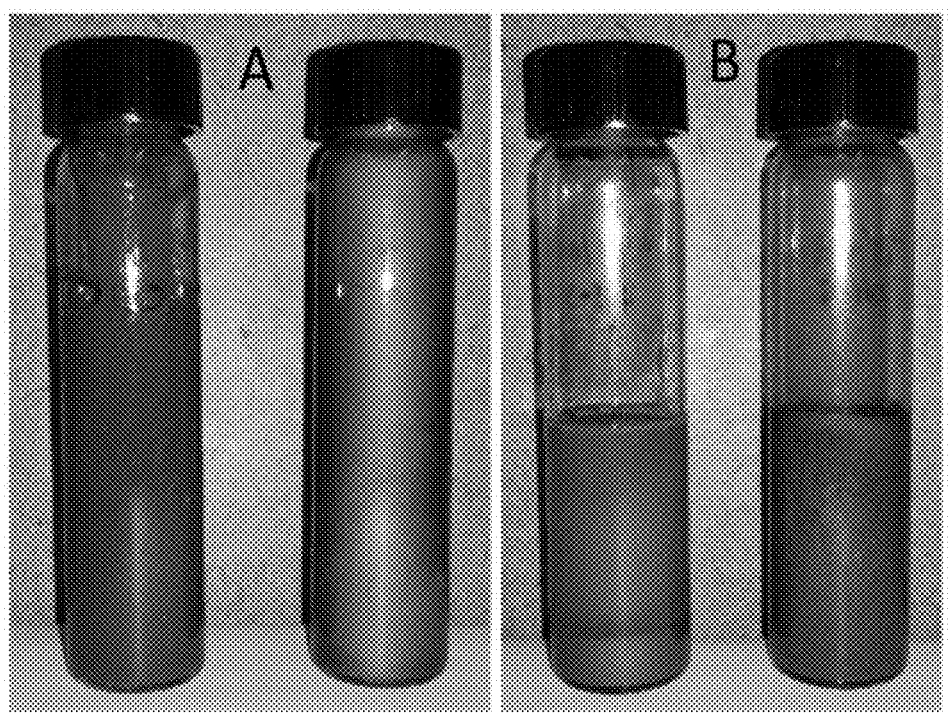
FIG. 9 is a photograph of fluids showing suspendability of zero valent iron particles (2 μm) by viscoelastic fluid, (a) samples right after vortex mixing, (b) samples after 10 minutes of centrifugation at 537 relative centrifugal force (RCF). Left vial, 26 wt % of zero valent iron in 2 wt % $C_8P_4E_1$ solution; right vial, 26 wt % of zero valent iron in viscoelastic fluid (2 wt % $C_8P_4E_1$ with 3.0 vol % oil).

FIG. 8 illustrates the proppant carrying performance of viscoelastic fluid. Ceramic proppants (3 pounds per gallon, specific gravity 2.5-3.2) settled down right after agitation in the oil-free $C_8P_4E_1$ solution. While in the oil-induced viscoelastic fluid, proppants were suspended homogeneously after agitation, and good suspendability was maintained after 24 hours of heating at 50° C. Besides, oil-induced viscoelastic fluid could also be used in other areas where fine particles need to be suspended, for instance, in stabilizing and transporting zero valent iron (ZVI) particles in environmental remediation work. FIG. 9 compared the suspendability of ZVI in both $C_8P_4E_1$ solution and $C_8P_4E_1$ viscoelastic fluid. Samples become completely black after mixing 4 grams of ZVI with 10 mL of dispersant solution (yielding mass concentration of ZVI 26 wt %). To facilitate sedimentation of particles, samples were centrifuged at 537 relative centrifugal force (RCF) for 10 minutes. It can be seen in FIG. 9(b) that in oil-free $C_8P_4E_1$ solution (0.005 Pa·s) ZVI precipitated at the bottom of the vial completely. While in oil-induced viscoelastic fluid, ZVI were well suspended after centrifugation because of high viscosity originated from entangled worms network. The viscoelastic fluids in FIG. 8 and FIG. 9 contain only 2 wt % $C_8P_4E_1$ and 3 vol % oil. To achieve the best suspendability, the concentration of $C_8P_4E_1$ as well as ratio between $C_8P_4E_1$ and oil could be optimized as shown in previous section.

Figure 10A:
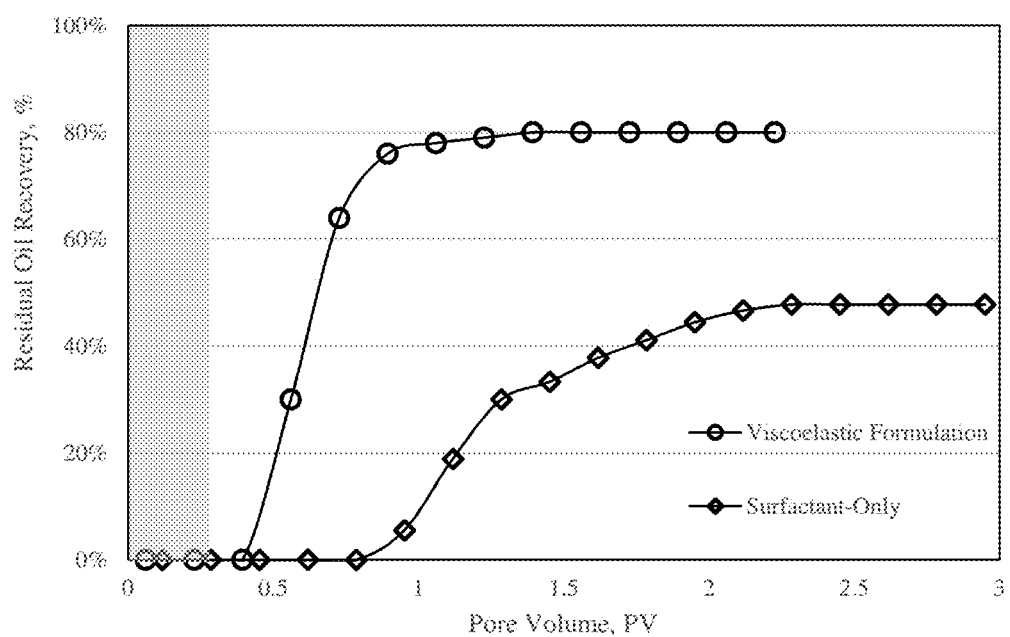
FIG. 10A shows a residual oil recovery profile of injecting 0.25 PV oil-induced viscoelastic fluid versus surfactant-only slug. Shaded area indicates the injection of chemical slug.
Figure 10B:
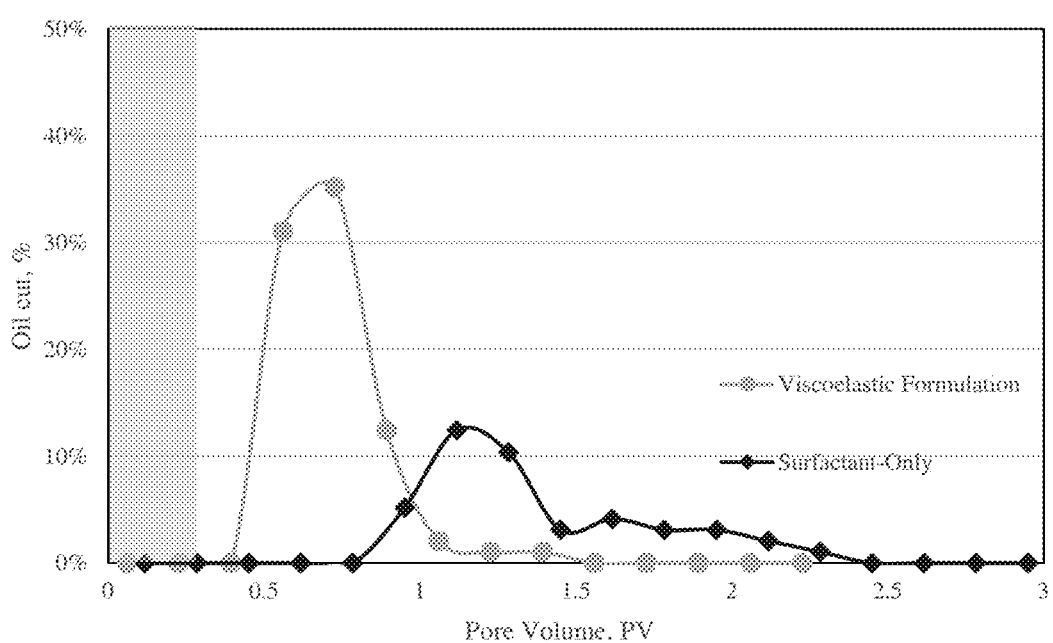
FIG. 10B shows oil cut history of injecting 0.25 PV oil-induced viscoelastic fluid versus surfactant-only slug. Oil-induced viscoelastic fluid contains 5.6 vol % of oil, i.e., 35 vol % of oil solubilized in the middle phase microemulsion. Shaded area indicates the injection of chemical slug.

As for the tertiary recovery chemical slug, the oil-induced viscoelastic fluid provides not only exceptional microscopic displacing efficiency but also favorable macroscopic sweep efficiency, compared to typical surfactant-only slug. In this endeavor, we tested the potential serving of oil-induced viscoelastic fluid as tertiary recovery surfactant slug via laboratory sand pack experiments. FIGS. 10A-10B compare the efficiency of viscoelastic fluid (2 wt % $C_8P_4E_1$ with 5.6 vol % oil) versus surfactant-only slug (2 wt % $C_8P_4E_1$) in residual oil recovery. 0.25 PV viscoelastic slug was able to recover 80% of residual oil, as compared to 48% of oil recovery made by the surfactant-only system without polymer injection. With improving both the volumetric sweep efficiency and microscopic displacement efficiency, viscoelastic fluid gave rise to a faster oil breakthrough and larger oil cut in comparison to surfactant-only slug. At 1 PV after chemical slug injected, the oil recovery is 77% with viscoelastic recipe vs. 10% in surfactant-only case. In general, the advantage of the presently disclosed viscoelastic formulations is that they provide a single-step process offering both the ultra-low interfacial tension and highly favorable rheological characteristic of the displacing agent, thus, providing a better alternative over the existing surfactant/polymer or micellar/polymer processes.

In summary, the rheological property of a micellar solution comprising the extended surfactant $C_8$—O—$(PO)_4$—$(EO)_1$—$SO_4Na$ ($C_8P_4E_1$) was extensively studied. Addition of as little as 3 vol % alkane into the $C_8P_4E_1$ formulations (2 wt %) promoted a sudden rise in viscoelastic behaviors, e.g. solution viscosity jumped 5 orders of magnitude. This volume of oil is less that the oil solubilization capacity of the surfactant at the conditions of an optimum Winsor III microemulsion. Oscillatory-shear (frequency sweep) measurements were performed on the viscoelastic samples and solid-like behaviors (G'>G") were observed in the entire frequency region (0.01-100 rad/s). Highly viscoelastic fluids were able to be formed via varying oil volume, type of counterion, and counterion concentration. Contrary to common oleo-responsive wormlike micelles, addition of paraffinic oil into $C_8P_4E_1$ solution within Type III system apparently gives rise to a favorable longitudinal growth of wormlike micelles. Incorporating oil to the spacer layer where PO groups reside apparently extends the PO groups and enlarges the tail length, thus resulting in an increasing end cap energy and promoting longitudinal growth of worms. This oil-induced viscoelastic behavior is not unique for $C_8P_4E_1SO_4$, we have observed such behavior in other propoxylated surfactants, as well. The discovery of this "abnormal oleo-responsive" viscoelastic behavior is of great significance in practical applications, such as oilfield fracking fluids, home care products, cosmetics, and drug delivery agents.

Further embodiments of the present disclosure are shown in Appendix 1 of U.S. Provisional Application Ser. No. 62/681,334, filed Jun. 6, 2018, the entirety of which is hereby incorporated herein by reference.

In at least certain embodiments, the present disclosure is directed to a viscoelastic emulsion formed by the steps of: combining a quantity of one or more extended surfactants with a quantity of brine to form a surfactant-brine mixture; and combining the surfactant-brine mixture with a quantity of an oil to form the viscoelastic emulsion, wherein said quantity of oil is an amount that, when the viscoelastic emulsion is allowed to coalesce, will cause formation of a composition comprising an oil-starved Winsor III microemulsion component and an excess oil component, and will not form a regular "3-phase" Winsor III microemulsion, and wherein the viscoelastic emulsion comprises: about 0.1 wt % to about 10 wt % of the one or more extended surfactants, about 0.1 wt % to about 30 wt % of a salt, about 0.1% to about 40 wt % of the oil, and about 25 wt % to about 99.7 wt % of water. The one or more extended surfactants may comprise one or more propylene oxide molecules and optionally one or more ethylene oxide molecules. The one or more extended surfactants may have the formula $R_1O(C_3H_6O)_m(C_2H_4O)_nXY$, wherein where $R_1$ is a linear or branched alkyl radical, or an alkenyl radical containing from 6 to 24 carbon atoms, m has an average value in a range of about 1 to about 20, n has an average value in a range of about 0 to about 20, X is a sulfate, sulfonate, phosphate, or carboxylate group, and Y is a monovalent or divalent cation. The oil of the viscoelastic emulsion may be a crude oil (petroleum), or a refined component of crude oil such as petroleum distillates, diesel, and/or kerosene, lubricating oils, metalworking fluids, vegetable oils, and methylated vegetable oils. The viscoelastic emulsion may further comprise a suspension or dispersion of nanoparticles. The nanoparticles may comprise 0.0001 wt % to about 60 wt % of the viscoelastic emulsion. The viscoelastic emulsion may comprise a fracturing proppant, forming a fracking fluid for use in a hydraulic fracturing operation. The fracking fluid may comprise about 24 g to about 1200 g of fracturing proppant per liter of fracking fluid. The fracking fluid may be substantially absent a gelling agent and substantially absent a gelling agent breaker. In at least certain embodiments, the present disclosure is directed to a method of treating an underground reservoir to enhance underground oil recovery, comprising providing the viscoelastic emulsion in any of the embodiments described hereinabove, and injecting the viscoelastic emulsion into the underground reservoir. The treatment may comprise flooding the underground reservoir in a tertiary oil recovery operation. The treatment may comprise an injection operation during a hydraulic fracturing operation. The oil of the viscoelastic emulsion may be a crude oil obtained from the underground reservoir into which the viscoelastic emulsion is introduced. The brine of the viscoelastic emulsion may be obtained from the underground reservoir into which the viscoelastic emulsion is injected.

While the present disclosure has been described herein in connection with certain embodiments so that aspects thereof may be more fully understood and appreciated, it is not intended that the present disclosure be limited to these particular embodiments. On the contrary, it is intended that all alternatives, modifications and equivalents are included within the scope of the present disclosure as defined herein. Thus the examples described above, which include particular embodiments, will serve to illustrate the practice of the inventive concepts of the present disclosure, it being understood that the particulars shown are by way of example and for purposes of illustrative discussion of particular embodiments only and are presented in the cause of providing what is believed to be the most useful and readily understood description of procedures as well as of the principles and conceptual aspects of the present disclosure. Changes may be made in the formulation of the various compositions described herein, the methods described herein or in the steps or the sequence of steps of the methods described herein without departing from the spirit and scope of the present disclosure. Further, while various embodiments of the present disclosure have been described in claims herein below, it is not intended that the present disclosure be limited to these particular claims.

What is claimed is:

1. A viscoelastic emulsion formed by the steps of:
combining a quantity of one or more extended surfactants with a quantity of brine to form a surfactant-brine mixture;
combining the surfactant-brine mixture with a quantity of an oil to form the viscoelastic emulsion, wherein said quantity of oil is an amount that, when the viscoelastic emulsion is allowed to coalesce, will cause formation of a composition comprising an oil-starved Winsor III microemulsion component and an excess oil component, and will not form a regular Winsor III microemulsion, and wherein the viscoelastic emulsion comprises:
about 0.1 wt % to about 10 wt % of the one or more extended surfactants,
about 10 wt % to about 30 wt % of a salt,
about 0.1% to about 40 wt % of the oil, and
about 25 wt % to about 99.7 wt % of water, and wherein at an oscillation frequency between 0.01 rad/s and 100 rad/s, the storage modulus G' of the viscoelastic emulsion is greater than the loss modulus G" of the viscoelastic emulsion; and
combining the viscoelastic emulsion with a fracturing proppant to form a fracking fluid.

2. The viscoelastic emulsion of claim 1, wherein the one or more extended surfactants comprises one or more propylene oxide molecules and/or one or more ethylene oxide molecules.

3. The viscoelastic emulsion of claim 1, wherein the one or more extended surfactants have a formula $R_1O(C_3H_6O)_m(C_2H_4O)_nXY$, wherein where $R_1$ is a linear or branched alkyl radical, or an alkenyl radical containing from 6 to 24 carbon atoms, m has an average value in a range of about 1 to about 20, n has an average value in a range of about 0 to about 20, X is a sulfate, sulfonate, phosphate, or carboxylate group, and Y is a monovalent or divalent cation.

4. The viscoelastic emulsion of claim 1, wherein the oil is selected from the group consisting of petroleum distillates, diesel, kerosene, lubricating oils, metalworking fluids, vegetable oils, and methylated vegetable oils.

5. The viscoelastic emulsion of claim 1, wherein the viscoelastic emulsion further comprises a suspension or dispersion of nanoparticles.

6. The viscoelastic emulsion of claim 5, wherein the nanoparticles comprise 0.0001 wt % to about 60 wt % of the viscoelastic emulsion.

7. The viscoelastic emulsion of claim 1, wherein the fracking fluid comprises about 24 g to about 1200 g of fracturing proppant per liter of fracking fluid.

8. The viscoelastic emulsion of claim 1, wherein the fracking fluid is substantially absent a gelling agent and substantially absent a gelling agent breaker.

9. A viscoelastic emulsion formed by the steps of:
combining a quantity of one or more extended surfactants with a quantity of brine to form a surfactant-brine mixture; and
combining the surfactant-brine mixture with a quantity of a crude oil to form the viscoelastic emulsion, wherein said quantity of crude oil is an amount that, when the viscoelastic emulsion is allowed to coalesce, will cause formation of a composition comprising an oil-starved Winsor III microemulsion component and an excess crude oil component, and will not form a regular Winsor III microemulsion, and wherein the viscoelastic emulsion comprises:
about 0.1 wt % to about 10 wt % of the one or more extended surfactants,
about 10 wt % to about 30 wt % of a salt,
about 0.1% to about 40 wt % of the crude oil, and
about 25 wt % to about 99.7 wt % of water, and wherein at an oscillation frequency between 0.01 rad/s and 100 rad/s, the storage modulus G' of the viscoelastic emulsion is greater than the loss modulus G" of the viscoelastic emulsion.

10. The viscoelastic emulsion of claim 9, wherein the one or more extended surfactants comprises one or more propylene oxide molecules and/or one or more ethylene oxide molecules.

11. The viscoelastic emulsion of claim 9, wherein the one or more extended surfactants have a formula $R_1O(C_3H_6O)_m(C_2H_4O)_nXY$, wherein where $R_1$ is a linear or branched alkyl radical, or an alkenyl radical containing from 6 to 24 carbon atoms, m has an average value in a range of about 1 to about 20, n has an average value in a range of about 0 to about 20, X is a sulfate, sulfonate, phosphate, or carboxylate group, and Y is a monovalent or divalent cation.

12. The viscoelastic emulsion of claim 9, wherein the viscoelastic emulsion further comprises a suspension or dispersion of nanoparticles.

13. The viscoelastic emulsion of claim 12, wherein the nanoparticles comprise 0.0001 wt % to about 60 wt % of the viscoelastic emulsion.

14. The viscoelastic emulsion of claim 9, wherein the viscoelastic emulsion further comprises a fracturing proppant, forming a fracking fluid for use in a hydraulic fracturing operation.

15. The viscoelastic emulsion of claim 14, wherein the fracking fluid comprises about 24 g to about 1200 g of fracturing proppant per liter of fracking fluid.

16. The viscoelastic emulsion of claim 14, wherein the fracking fluid is substantially absent a gelling agent and substantially absent a gelling agent breaker.

17. A viscoelastic emulsion formed by the steps of:
combining one or more extended surfactants with a quantity of brine to form a surfactant-brine mixture; and
combining the surfactant-brine mixture with a quantity of an oil to form the viscoelastic emulsion, wherein the viscoelastic emulsion comprises:
about 0.2 wt % to about 10 wt % of the one or more extended surfactants,
about 15 wt % to about 30 wt % of a salt,
about 0.5% to about 40 wt % of the oil, and
about 25 wt % to about 84.3 wt % of water, and wherein at an oscillation frequency between 0.01 rad/s and 100 rad/s, the storage modulus G' of the viscoelastic emulsion is greater than the loss modulus G" of the viscoelastic emulsion.

18. The viscoelastic emulsion of claim 17, wherein the one or more extended surfactants comprises one or more propylene oxide ($C_3H_6O$) molecules and/or one or more ethylene oxide ($C_2H_4O$) molecules.

19. The viscoelastic emulsion of claim 17, wherein the one or more extended surfactants is selected from the group consisting of monoalkyl branched propoxy sulfates and alkyl propoxy ethoxy sulfates.

20. The viscoelastic emulsion of claim 19, wherein the monoalkyl propoxy sulfates have the formula $C_n$—$(PO)_x$—$SO_4Na$, where n=6 to 18 or greater, and x=1 to 20.

21. The viscoelastic emulsion of claim 19, wherein the alkyl propoxy ethoxy sulfates have the formula $C_n$—$(PO)_x$-$(EO)_y$—$SO_4Na$, where n=6 to 18 or greater, x=1 to 20, and y=1 to 20.

22. The viscoelastic emulsion of claim 17, wherein the oil is an oil that is able to form a Winsor III microemulsion.

23. The viscoelastic emulsion of claim 17, wherein the viscoelastic emulsion further comprises a suspension or dispersion of nanoparticles.

24. The viscoelastic emulsion of claim 17, wherein the nanoparticles comprise 0.0001 wt % to about 60 wt % of the viscoelastic emulsion.

25. The viscoelastic emulsion of claim 17, wherein the viscoelastic emulsion further comprises a fracturing proppant, forming a fracking fluid.

26. The viscoelastic emulsion of claim 25, wherein the fracking fluid comprises about 0.2 pounds to about 10 pounds of fracturing proppant per gallon of fracking fluid.

27. The viscoelastic emulsion of claim 25, wherein the fracking fluid is absent or substantially absent a gelling agent and is absent or substantially absent a gelling agent breaker.

* * * * *